United States Patent
Sun et al.

(10) Patent No.: US 9,722,828 B2
(45) Date of Patent: Aug. 1, 2017

(54) SWITCH CAPACITOR DECISION FEEDBACK EQUALIZER WITH INTERNAL CHARGE SUMMATION

(71) Applicant: QUALCOMM Incorporated, San Diego, CA (US)

(72) Inventors: Li Sun, San Diego, CA (US); Xiaohua Kong, San Diego, CA (US); Zhi Zhu, San Diego, CA (US); Miao Li, San Marcos, CA (US); Dong Ren, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/862,677

(22) Filed: Sep. 23, 2015

(65) Prior Publication Data
US 2017/0085403 A1    Mar. 23, 2017

(51) Int. Cl.
H04L 25/00 (2006.01)
H04L 27/01 (2006.01)
H04L 25/03 (2006.01)
H04L 25/02 (2006.01)

(52) U.S. Cl.
CPC .......... *H04L 27/01* (2013.01); *H04L 25/0272* (2013.01); *H04L 25/0292* (2013.01); *H04L 25/03006* (2013.01); *H04L 25/03146* (2013.01); *H04L 25/03878* (2013.01)

(58) Field of Classification Search
USPC ........................................ 375/233
See application file for complete search history.

(56) References Cited

U.S. PATENT DOCUMENTS

| | | | | |
|---|---|---|---|---|
| 4,686,686 A | * | 8/1987 | Nakayama | H04L 25/03019 333/18 |
| 4,862,121 A | * | 8/1989 | Hochschild | H03H 19/004 330/107 |
| 5,692,006 A | * | 11/1997 | Ross | H04B 1/7097 375/147 |
| 6,194,946 B1 | * | 2/2001 | Fowers | G06G 7/1865 327/337 |

(Continued)

OTHER PUBLICATIONS

Toifl, Thomas, Low-power high-speed CMOS IOs_ Design challenge and solutions, TWEPP, Sep. 2012 (a prior art NPL provided in the IDS filed Sep. 23, 2015 by the applicant).*
(Continued)

*Primary Examiner* — Daniel Washburn
*Assistant Examiner* — Berhanu Tadese
(74) *Attorney, Agent, or Firm* — Loza & Loza, LLP/Qualcomm

(57) ABSTRACT

In one embodiment, a receiver comprises a latch configured to receive a data signal and to latch symbols of the received data signal, and a decision feedback equalizer. The decision feedback equalizer comprises a first feedback capacitor having first and second terminals, the first terminal being coupled to a first internal node of the latch. The decision feedback equalizer also comprises a first plurality of switches configured to alternatively couple the second terminal of the first feedback capacitor to a first feedback signal and a ground, the first feedback signal having a first voltage that is a function of a bit decision corresponding to a first previous symbol in the data signal preceding a current symbol in the data signal.

32 Claims, 12 Drawing Sheets

(56) References Cited

U.S. PATENT DOCUMENTS

| | | | | |
|---|---|---|---|---|
| 6,504,412 | B1* | 1/2003 | Vangal | H03K 3/356191 327/203 |
| 7,539,243 | B1* | 5/2009 | Toifl | H04L 25/03057 327/100 |
| 7,656,226 | B2* | 2/2010 | Johnson | H03H 19/004 330/9 |
| 7,936,812 | B2* | 5/2011 | Hollis | H03K 3/356113 375/233 |
| 7,986,728 | B2* | 7/2011 | Abrishamkar | H04L 23/02 375/233 |
| 8,680,937 | B2* | 3/2014 | Chang | H03H 7/40 333/18 |
| 9,285,778 | B1* | 3/2016 | Evans | G04F 10/005 |
| 9,350,331 | B2* | 5/2016 | Cyrusian | H03K 3/0375 |
| 2003/0201800 | A1* | 10/2003 | Matsuo | H03M 9/00 327/57 |
| 2006/0188043 | A1* | 8/2006 | Zerbe | H04L 1/0026 375/346 |
| 2006/0239341 | A1* | 10/2006 | Marlett | H04L 25/03057 375/233 |
| 2007/0252630 | A1* | 11/2007 | Sumesaglam | G11C 7/1078 327/218 |
| 2008/0297393 | A1* | 12/2008 | Sollner | H03M 1/44 341/172 |
| 2010/0202506 | A1* | 8/2010 | Bulzacchelli | H04L 25/03057 375/233 |
| 2010/0309156 | A1* | 12/2010 | Hsueh | G06F 1/1684 345/173 |
| 2011/0227639 | A1* | 9/2011 | Phan | G11C 7/02 327/563 |
| 2012/0033721 | A1* | 2/2012 | Isson | H04L 25/03057 375/227 |
| 2012/0201289 | A1* | 8/2012 | Abdalla | H04L 25/0272 375/233 |
| 2013/0214865 | A1* | 8/2013 | Bulzacchelli | H03F 1/0261 330/261 |
| 2013/0257483 | A1* | 10/2013 | Bulzacchelli | H03K 3/012 327/53 |
| 2013/0266055 | A1* | 10/2013 | Matsumoto | H04L 25/06 375/232 |
| 2014/0232464 | A1* | 8/2014 | Song | H04L 27/01 330/258 |
| 2014/0266123 | A1* | 9/2014 | Rader | H02M 3/156 323/288 |
| 2014/0355662 | A1* | 12/2014 | Kizer | H04L 25/0276 375/233 |
| 2015/0311875 | A1* | 10/2015 | Chen | G11C 7/065 327/52 |
| 2015/0312060 | A1* | 10/2015 | Sinha | H04L 25/03057 375/233 |
| 2015/0358005 | A1* | 12/2015 | Chen | H03K 5/003 375/233 |

OTHER PUBLICATIONS

Razavi, The StrongARM Latch [A Circuit for All Seasons], in IEEE Solid-State Circuits Magazine, vol. 7, No. 2, pp. 12-17, Jun. 2015.*

Emami-Neyestanak A., et al., "A 6.0-mW 10.0-Gb/s Receiver With Switched-Capacitor Summation DFE", IEEE Journal of Solid-State Circuits, Apr. 2007, vol. 42, No. 4, pp. 889-896.

Rylyakov a., "An 11 Gb/s 2.4 mW Half-Rate Sampling 2-Tap DFE Receiver in 65nm CMOS", Symposium on V/LSI Circuits Digest of Technical Papers, 2007, pp. 272-273.

Kim, Byungsub,et al., "A 10-Gb/s Compact Low-Power Serial I/O With DFE-IIR Equalization in 65-nm CMOS", IEEE Journal of Solid-State Circuits, vol. 44, No. 12, Dec. 2009, p. 3526-3538.

Ibrahim, Sameh, et al., "Low-Power CMOS Equalizer Design for 20-Gb/s Systems", IEEE Journal of Solid-State Circuits, vol. 46, No. 6, Jun. 2011, p. 1321-1336.

Son, et al., "A 2.3-mW, 5-Gb/s Low-Power Decision-Feedback Equalizer Receiver Front-End and its Two-Step, Minimum Bit-Error-Rate Adaptation Algorithm", IEEE Journal of Solid-State Circuits, vol. 48, No. 11, Nov. 2013, p. 2693-2704.

Toifl, Thomas, "Low-power High-Speed CMOS I/Os: Design Challenges and Solutions", IBM Research GmbH Zurich Research Laboratory Rüschlikon, Switzerland, TWEPP 2012, Sep. 20, 2012.

International Search Report and Written Opinion—PCT/US2016/051356—ISA/EPO—Nov. 30, 2016.

Jiang T., et al., "Energy-Efficient, Decision Feedback Equalization Using SAR-like Capacitive Charge Summation", VLSI Design Automation and Test (VLSI-DAT), 2010 International Symposium on, IEEE, Piscataway, NJ, USA, Apr. 26, 2010, pp. 249-252, XP031698621, ISBN: 978-1-4244-5269-9.

Song S., et al., "A 6.25 Gb/s Voltage-Time Conversion Based Fractionally Spaced Linear Receive Equalizer for Mesochronous High Speed Links", IEEE Journal of Solid-State Circuits, IEEE Service Center, Piscataway, NJ, USA, vol. 46, No. 5, May 1, 2011, pp. 1183-1197, XP011354530, ISSN: 0018-9200, DOI:10.11 09/JSSC.2011.21 05670.

Toifl T., et al., "A 2.6 mW/Gbps 12.5 Gbps RX With 8-Tap Switched-Capacitor DFE in 32 nm CMOS", IEEE Journal of Solidstate Circuits, IEEE Service Center, Piscataway, NJ, USA, vol. 47, No. 4, Apr. 1, 2012, pp. 897-910, XP011440054, ISSN: 0018-9200, DOI: 10.11 09/JSSC.2012.2185342.

\* cited by examiner

SWITCH CAPACITOR DECISION FEEDBACK EQUALIZER WITH INTERNAL CHARGE SUMMATION

BACKGROUND

Field

Aspects of the present disclosure relate generally to equalizers, and more particularly, to decision feedback equalizers.

Background

In a communication system (e.g., SerDes communication system), data symbols may be transmitted from a transmitting device to a receiving device across a channel. Because of bandwidth limitations of the channel, the data symbols at the receiving device may be distorted. The distortion may cause the symbols to spread into one another, resulting in intersymbol interference (ISI) at the receiving device. The receiving device may reduce the ISI by employing decision feedback equalization, in which a weighted sum of previous bit decisions is subtracted from a current symbol to reduce ISI from previous symbols.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a receiver is described herein. The receiver comprises a latch configured to receive a data signal and to latch symbols of the received data signal, and a decision feedback equalizer. The decision feedback equalizer comprises a first feedback capacitor having first and second terminals, the first terminal being coupled to a first internal node of the latch. The decision feedback equalizer also comprises a first plurality of switches configured to alternatively couple the second terminal of the first feedback capacitor to a first feedback signal and a ground, the first feedback signal having a first voltage that is a function of a bit decision corresponding to a first previous symbol in the data signal preceding a current symbol in the data signal.

A second aspect relates to a method of decision feedback equalization. The method comprises latching symbols of a data signal using a latch, and generating a first feedback signal having a first voltage that is a function of a bit decision corresponding to a first previous symbol in the data signal preceding a current symbol in the data signal. The method also comprises alternately coupling a first terminal of a first feedback capacitor to the first feedback signal and a ground, wherein a second terminal of the first feedback capacitor is coupled to a first internal node of the latch.

A third aspect relates to an apparatus for decision feedback equalization. The apparatus comprises means for latching symbols of a data signal, and means for generating a first feedback signal having a first voltage that is a function of a bit decision corresponding to a first previous symbol in the data signal preceding a current symbol in the data signal. The apparatus also comprises means for alternately coupling a first terminal of a first feedback capacitor to the first feedback signal and a ground, wherein a second terminal of the first feedback capacitor is coupled to a first internal node of the latch.

A fourth aspect relates to a receiver. The receiver comprises a latch configured to receive a data signal and to latch symbols of the received data signal, and a decision feedback equalizer. The decision feedback equalizer comprises a first feedback capacitor having first and second terminals, the first terminal being coupled to a first internal node of the latch. The decision feedback equalizer also comprises a switch between the second terminal of the first feedback capacitor and a ground, wherein the switch is driven by a first feedback signal, the first feedback signal having a first voltage that is a function of a bit decision corresponding to a first previous symbol in the data signal preceding a current symbol in the data signal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
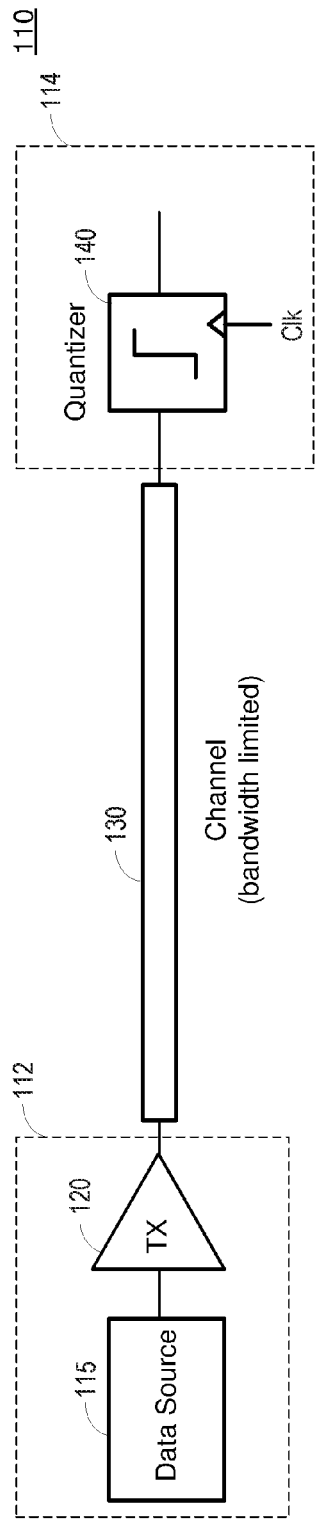
FIG. 1 shows an example of a communication system.
Figure 2A:
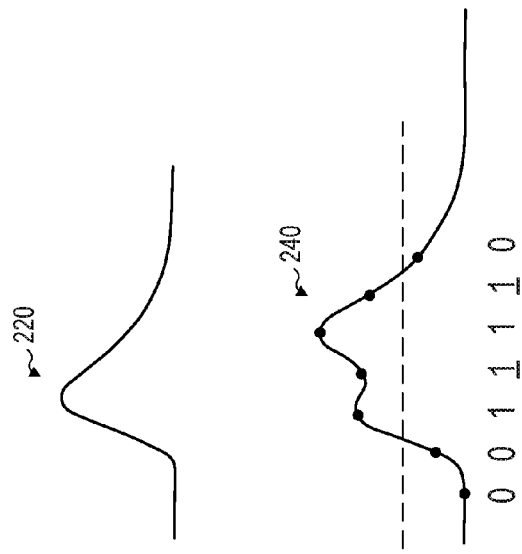
FIG. 2A shows an example of signal distortion caused by a bandwidth-limited channel.

FIG. 1 shows an example of a communication system 110 in which data is transmitted from a transmitting device 112 to a receiving device 114 across a channel 130. At the transmitting device 112, a transmitter 120 receives data bits from a data source 115, and transmits the data bits as a sequence of symbols across the channel 130. At the receiving device 114, a quantizer 140 receives the symbols from the channel 130, and quantizes the symbols into a sequence of data bits. In this regard, FIG. 2A shows an example in which a symbol 210 corresponding to a bit value of one is transmitted across the channel 130. As shown in FIG. 2A, the symbol 220 is distorted at the receiving device 114 due to the bandwidth limitation of the channel 130, in which the channel 130 attenuates signals at high frequencies. The distortion spreads out the symbol 220.

Figure 2B:
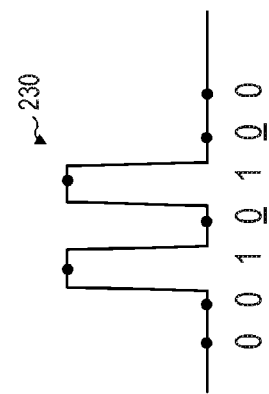
FIG. 2B shows an example of intersymbol interference caused by a bandwidth-limited channel.

FIG. 2B shows an example in which a sequence of symbols 230 corresponding to the bit sequence "0010100" is transmitted across the channel 130. As shown in FIG. 2B, the sequence of symbols 240 is distorted at the receiving device 114 due to the bandwidth limitation of the channel 130. The channel distortion causes the symbols to spread into one another at the receiving device 114, resulting in inter-symbol interference (ISI). At the receiving device 114, the quantizer 140 samples the symbols at sampling points (shown as solid dots in FIG. 2B) using a sampling clock (denoted "clk"). At each sampling point, the quantizer 140 decides whether the respective symbol corresponds to a bit value of one or zero using a decision threshold (shown as a dashed line in FIG. 2B). Because of the ISI, the quantizer 140 incorrectly decides a bit sequence of "0011110", which differs from the bit sequence "0010100" at the transmitting device 112.

Figure 3:
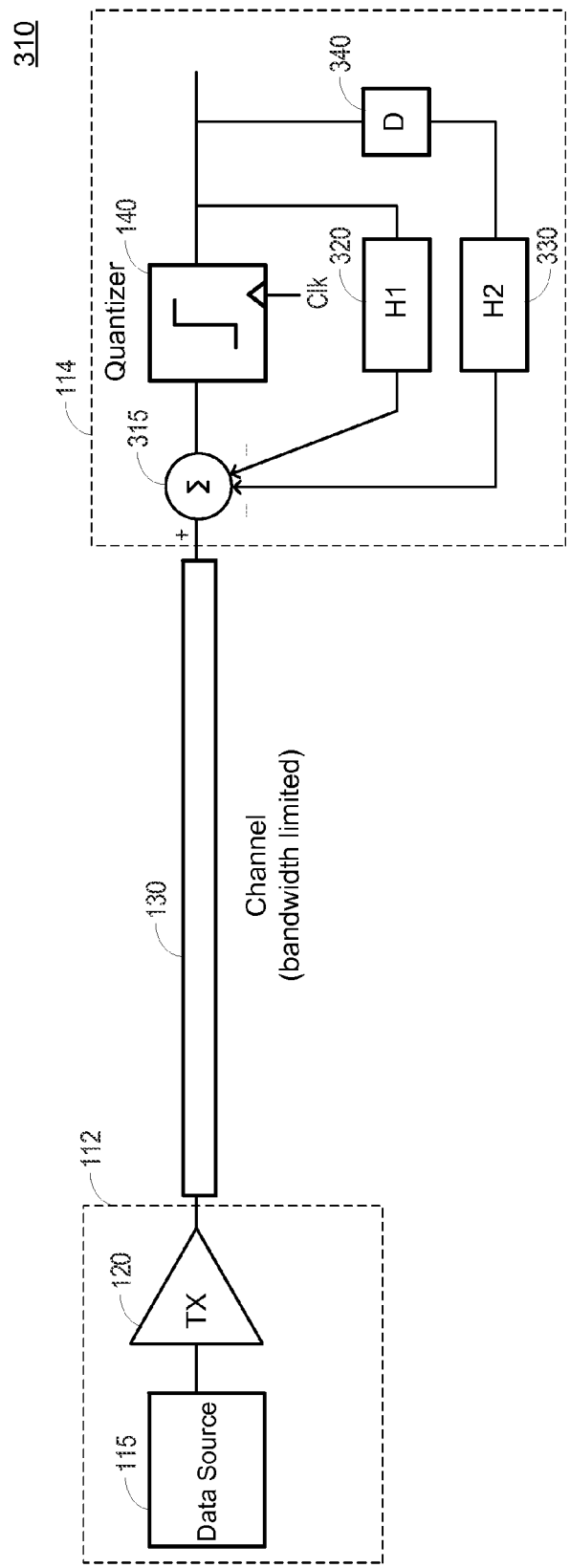
FIG. 3 shows an example of a two-tap decision feedback equalizer.

FIG. 3 shows a communication system 310 in which the receiving device 114 employs decision-feedback equalization to reduce ISI. In this regard, the receiving device 114 comprises a summer 315, a first multiplier 320, a second multiplier 330, and a delay element 340. The summer 315 is coupled between the channel 130 and the input of the quantizer 140. The first multiplier 320 receives the previous bit decision from the output of the quantizer 140 (which corresponds to the symbol immediately preceding the current symbol). The first multiplier 320 multiplies the previous bit decision by a first coefficient H1, and outputs the resulting product to the summer 315, which subtracts the product from the current symbol input to the quantizer 140. The delay element 340 delays the output of the quantizer 140 by one period of the sampling clock clk and outputs the second previous bit decision (which corresponds to the symbol preceding the current symbol by two clock periods). The second multiplier 330 then multiplies the second previous bit decision by a second coefficient H2, and outputs the resulting product to the summer 315, which subtracts the product from the current symbol input to the quantizer 140.

Thus, a weighted sum of the two previous bit decisions is subtracted from the current symbol to cancel out portions of the two previous symbols that are spread into the current symbol, thereby reducing ISI from the two previous symbols. The values of the coefficients H1 and H2 may be adjusted (tuned) according to the characteristics of the channel 130. FIG. 3 shows an example of a two-tap decision feedback equalizer (DFE) in which a weighted sum of the previous two bit decisions is subtracted from the current symbol. However, it is to be appreciated that the DFE may include any number of taps. The coefficients H1 and H2 may be referred to as filter coefficients since the DFE implements a finite impulse response (FIR) filter. As used herein, the term "first previous bit decision" refers to a bit decision corresponding to a previous symbol immediately preceding a current symbol, and "second previous bit decision" refers to a bit decision corresponding to a previous symbol preceding a current symbol by two clock periods.

Figure 4:
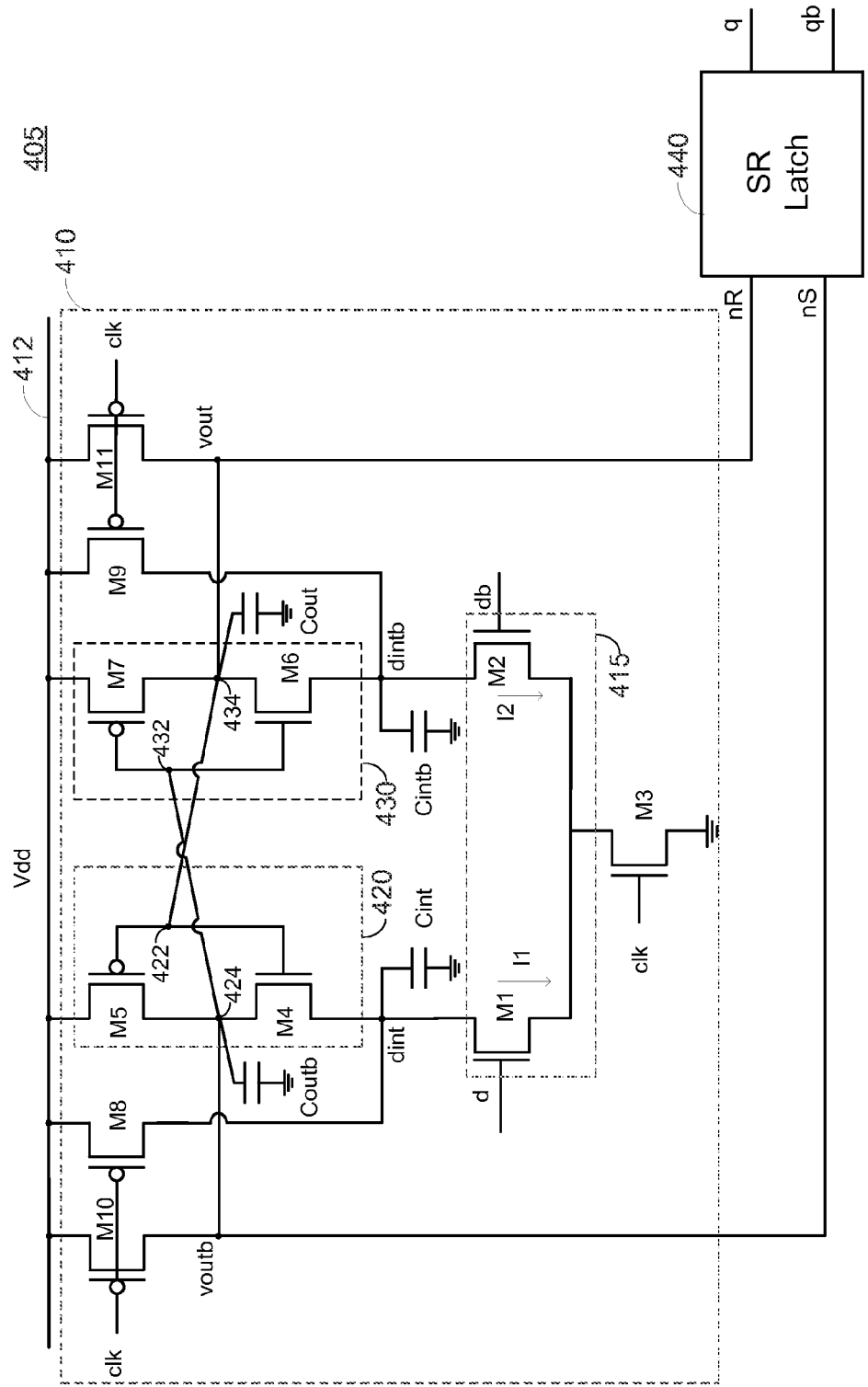
FIG. 4 shows an example of a strong-arm latch.

FIG. 4 shows an example of a quantizer 405 comprising a strong-arm latch 410 (also referred to as "StrongARM" latch) and a set-reset (SR) latch 440 coupled to the strong-arm latch 410. The quantizer 405 samples symbols in an incoming data signal according to a sampling clock clk, and converts the sampled symbols into a sequence of bits, as discussed further below.

The strong-arm latch 410 comprises an input driver 415 including a first input NMOS transistor M1 and a second input NMOS transistor M2 configured to receive a differential data signal (d and db). The strong-arm latch 410 also comprises two cross-coupled inverters 420 and 430, where a first one of the inverters 420 comprises PMOS transistor M5 and NMOS transistor M4 and a second one of the inverters 430 comprises PMOS transistor M7 and NMOS transistor M6. The output 424 of the first inverter 420 is coupled to the input 432 of the second inverter 430 (i.e., the gates of PMOS transistor M7 and NMOS transistor M6), and the output 434 of the second inverter 430 is coupled to the input 422 of the first inverter 420 (i.e., the gates of PMOS transistor M5 and NMOS transistor M4). The source of NMOS transistor M4 is coupled to the drain of the first input NMOS transistor M1, and the source of NMOS transistor M6 is coupled to the drain of the second input NMOS transistor M2.

The strong-arm latch 410 also comprises switching NMOS transistor M3 coupled between the sources of the input NMOS transistors M1 and M2 and ground, and switching PMOS transistors M8 and M9 coupled between the supply rail 412 and internal nodes dint and dintb, respectively, of the strong-arm latch 410. Internal node dint is between the source of NMOS transistor M4 and the drain of the input first NMOS transistor M1, and internal node dintb is between the source of NMOS transistor M6 and the drain of the second input NMOS transistor M2, as shown in FIG. 4. The strong-arm latch 410 further comprises switching PMOS transistor M10 coupled between the supply rail 412 and output 424, and switching PMOS transistor M11 coupled between the supply rail 412 and output 434. The gate of each of the switching transistors M3 and M8-M11 is driven by the sampling clock signal clk, as discussed further below. The sampling clock signal clk may be provided by a clock recovery circuit that recovers a clock signal from the data signal, a clock generator, etc. The switching transistors M3 and M8-M11 may be considered reset switches that reset the latch 410 during a reset phase, as discussed further below.

In operation, the gates of the input NMOS transistors M1 and M2 receive the differential data signal (d and db), in which symbols corresponding to different bit values may be transmitted from the transmitting device 112 by changing the polarity of the differential data signal (d and db). For example, a bit value of one may correspond to the voltage of d being higher than the voltage of db, and a bit value of zero may correspond to the voltage of db being higher than the voltage of d. The strong-arm latch 410 samples a differential input voltage corresponding to a symbol of the differential data signal (d and db), and converts the differential input voltage into a large differential voltage (vout and voutb) representing the bit value of the symbol, as discussed further below.

When the sampling clock signal clk is low, switching PMOS transistors M8-M11 are closed and switching NMOS transistor M3 is open. As a result, output capacitors Coutb and Cout at the outputs 424 and 434 of the latch 410 are coupled to the supply rail 412 through switching PMOS transistors M10 and M11, respectively. As a result, the output capacitors Coutb and Cout are charged to approximately Vdd (i.e., voltage of the supply rail 412). Also, internal capacitors Cint and Cinb at internal nodes dint and dintb, respectively, are coupled to the supply rail 412 through switching PMOS transistors M8 and M9, respectively. As a result, the internal capacitors Cint and Cintb are also charged approximately to Vdd. Thus, the output capacitors Coutb and Cout and the internal capacitors Cint and Cintb are charged approximately to Vdd during the time that the clock signal clk is low (referred to as the "reset" phase or "pre-charge" phase). Further, the sources of the input NMOS transistors M1 and M2 are decoupled from ground by switching NMOS transistor M3 (which is open), thereby disabling the input driver 415. This prevents the input NMOS transistors M1 and M2 from discharging the capacitors during the reset phase.

During the reset phase, the differential data signal (d and db) is not sampled. As discussed further below, the output capacitors Coutb and Cout and the internal capacitors Cint and Cintb are pre-charged during the reset phase to prepare the latch 410 to sample the data signal during an integration phase following the reset phase.

When the clock signal clk goes high, the latch 410 enters the integration phase. The high clock signal causes switching PMOS transistors M8-M11 to open and switching NMOS transistor M3 to close. As a result, the output capacitors Coutb and Cout and the internal capacitors Cint and Cintb are decoupled from the supply rail 412. At the start of the integration phase, the output capacitors Coutb and Cout and the internal capacitors Cint and Cintb are charged at approximately Vdd. Thus, the voltages at the outputs 424 and 434 of the latch 410 are approximately equal to Vdd at the start of the integration phase.

The input NMOS transistors M1 and M2 convert the voltages of d and db into currents I1 and I2, respectively. The current I1 from the first input NMOS transistor M1 (which is driven by d) discharges internal capacitor Cint, and therefore lowers the voltage at internal node dint. The current I2 from the second input NMOS transistor M2 (which is drive by db) discharges internal capacitor Cintb, and therefore lowers the voltage at internal node dintb.

The currents I1 and I2 of the input NMOS transistors M1 and M2 are a function of the voltages of d and db. For example, if d is greater than db, then the current I1 of the first input NMOS transistor M1 may be greater (stronger) than the current I2 of the second input NMOS transistor M2. In this example, internal capacitor Cint may discharge faster than internal capacitor Cintb, and therefore the voltage at internal node dint may fall faster than the voltage at internal node dintb.

As the voltages at internal nodes dint and dintb fall, NMOS transistors M4 and M6 begin to turn on. This is because the gate-to-source voltages of NMOS transistors M4 and M6 increase as the voltages at internal nodes dint and dintb fall. As a result, NMOS transistors M4 and M6 provide conduction paths for the currents I1 and I2 of the input NMOS transistors M1 and M2 to discharge the output capacitors Coutb and Cout, and therefore lower the voltages vout and voutb at the outputs 434 and 424. For the example in which d is greater than db, the current I1 of the first input NMOS transistor M1 may be greater (stronger) than the current I2 of the second input NMOS transistor M2. As a result, the voltage voutb at output 424 may fall faster than the voltage vout at output 434 in this example.

In the above example where d is greater than db, PMOS transistor M7 may turn on when the voltage voutb at output 424 falls below a certain voltage (e.g., approximately equal to Vdd minus the threshold voltage of PMOS transistor M7). This is because voltage voutb is applied to the gate of PMOS transistor M7 (which is coupled to output 424). When PMOS transistor M7 turns on, a conduction path is provided between the supply rail 412 and output 434 through PMOS transistor M7. This allows the supply rail 412 to recharge output capacitor Cout at output 434 through PMOS transistor M7, which may cause the voltage vout at output 434 to start increasing. The increase in the voltage vout at output 434 helps keep PMOS transistor M5 turned off. This is because the voltage vout is applied to the gate of PMOS transistor M5 (which is coupled to output 434). As a result, the current I1 from the first transistor M1 is allowed to further discharge output capacitor Coutb at output 424, and therefore further reduce voltage voutb. As the voltage voutb decreases, NMOS transistor M6 may begin turning off, allowing the supply rail 412 to further recharge output capacitor Cout at output 434, and therefore further increase vout.

Thus, the cross-coupled inverters 420 and 430 provide positive feedback that causes voltage vout to regenerate (increase) and voltage voutb to decrease further, thereby increasing the difference between vout and voutb. For the example in which db is greater than d, the positive feedback of the cross-coupled inverters 420 and 430 may cause voutb to regenerate (increase) and vout to further decrease. Thus, once the cross-coupled inverters 420 and 430 are triggered, the positive feedback of the cross-coupled inverters 420 and 430 amplifies the voltage difference between internal nodes dint and dintb at the outputs 424 and 434 of the latch 410. In other words, the input driver 415 triggers the cross-coupled inverters 420 and 430 to enter one of two output states depending on d and db of the data signal, in which outputs 424 and 434 are high and low, respectively, in a one of the output states and outputs 434 and 424 are low and high, respectively, in the other output state.

Therefore, at the end of the integration phase, the strong-arm latch 410 may convert a relatively small differential voltage at the differential input into a large differential voltage vout and voutb. The polarity of the differential output voltage (vout and voutb) may represent the bit value of the corresponding symbol. For example, a bit value of one may correspond to vout being higher than voutb, and a bit value of zero may correspond to voutb being higher than vout. The strong-arm latch 410 generally consumes less power than a current mode logic (CML) latch (which may continuously consume current), and therefore may be suitable for low power applications.

Before the clock signal clk goes low at the end of the integration phase, the SR latch 440 latches the output voltages vout and voutb of the strong-arm latch 410, and outputs the latched output voltages vout and voutb as outputs q and qb, respectively. More particularly, when vout is higher than voutb, the outputs q and qb of the SR latch 440 may be high and low, respectively, which may correspond to a bit decision of one. When voutb is higher than vout, the outputs q and qb of the SR latch 440 may be low and high, respectively, which may correspond to a bit decision of zero. During the next reset phase, the outputs q and qb of the SR latch 440 remain static. Thus, the SR latch 440 outputs the bit decision from the integration phase during the next reset phase. In other words, each time the strong-arm latch 410 is in a reset phase, the outputs q ad qb of the SR latch 440 provide the bit decision from the preceding integration phase. An exemplary implementation of the SR latch 440 is discussed further below with reference to FIG. 12.

Figure 5:
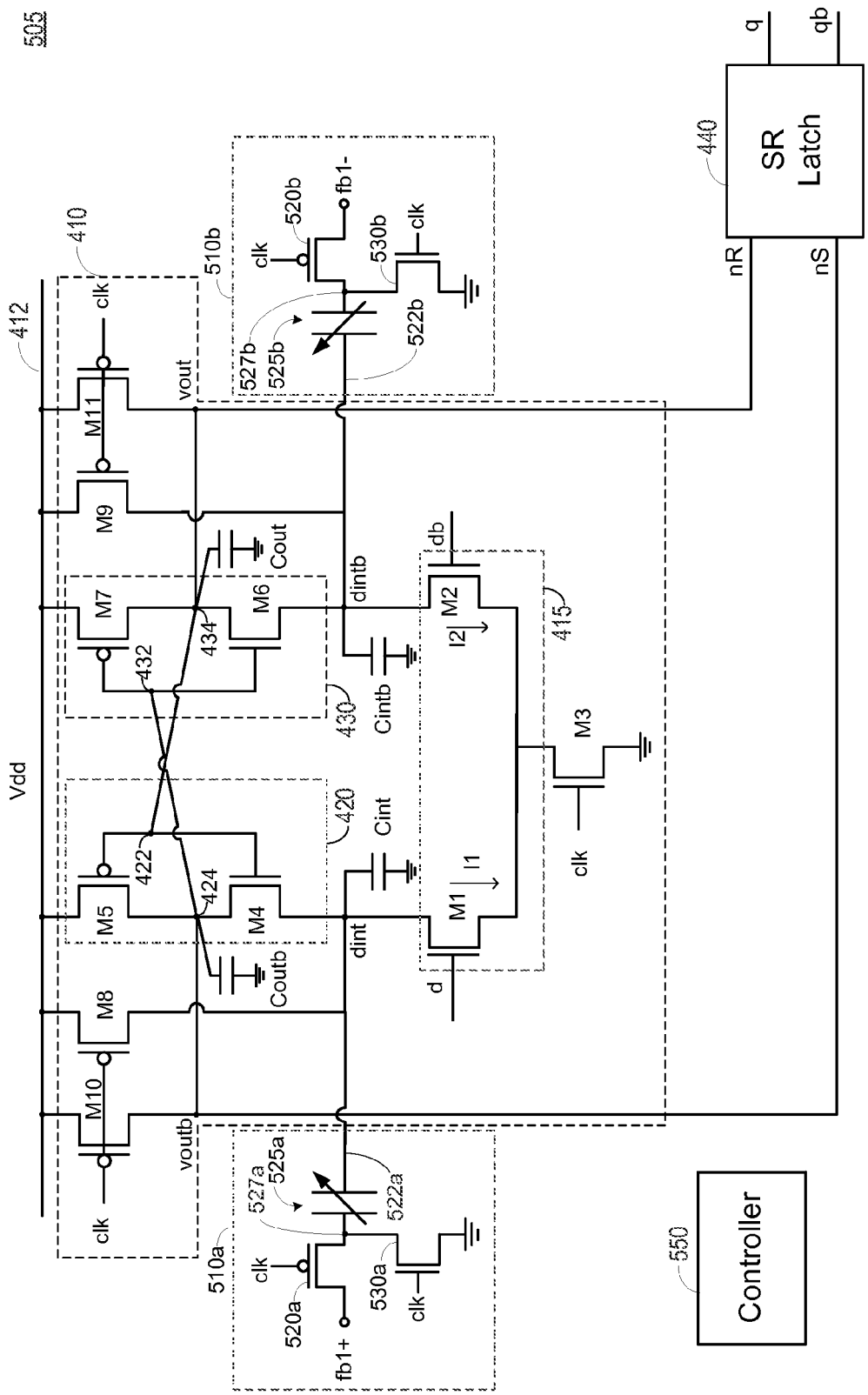
FIG. 5 shows an example of a latch and a decision feedback equalizer according to certain aspects of the present disclosure.

Embodiments of the present disclosure provide decision feedback equalization with linear characteristics and low hardware costs. In this regard, FIG. 5 shows a quantizer 505 according to certain aspects of the present disclosure. The quantizer 505 comprises a decision feedback equalizer including a first feedback circuit 510a and a second feedback circuit 510b. The first and second feedback circuits 510a and 510b are configured to feedback the first previous bit decision to the latch 410, as discussed further below. In certain aspects, feedback of the first previous bit decision is provided by first and second complementary feedback signals fb1+ and fb1−. For example, the first feedback signal fb1+ may be high when the first previous bit decision is one and low when the first previous bit decision is zero, or vise versa. The "1" in fb1+ and fb1− indicates that the first and second feedback signals provide feedback of the first previous bit decision.

In one embodiment, the first feedback circuit 510a comprises a first feedback capacitor 525a, a first switching PMOS transistor 520a, and a first switching NMOS transistor 530a. A first terminal 522a of the first feedback capacitor 525a is coupled to internal node dint of the latch 410, and a second terminal 527a of the first feedback capacitor 525a is coupled to the switching transistors 520a and 530a. The first switching PMOS transistor 520a is between the second terminal 527a of the first feedback capacitor 525a and the first feedback signal fb1+, and the first switching NMOS transistor 530a is between the second terminal 527a of the first feedback capacitor 525a and ground, as shown in FIG. 5.

The gates of both switching transistors 520a and 530a are driven by the clock signal clk. The first switching PMOS transistor 520a is configured to couple the second terminal 527a of the first feedback capacitor 525a to the first feedback signal fb1+ when the clock signal clk is low (i.e., during a reset phase of the latch 410). The first NMOS transistor 530a is configured to couple the second terminal 527a of the first feedback capacitor 525a to ground when the clock signal clk is high (i.e., during an integration phase of the latch 410). In one example, the first feedback signal fb1+ may have a voltage of approximately Vdd when the first previous bit is one and a voltage approximately equal to zero volts (ground) when the first previous bit is zero, or vice versa.

The first terminal 522a of the first feedback capacitor 525a is charged to Vdd when the clock signal is low through switching PMOS transistor M8, and discharged to approximately ground when the clock signal is high through NMOS transistor M1. Thus, if the first feedback signal fb1+ has a voltage of approximately Vdd, then the voltage across the first feedback capacitor 525a approximately does not change. In this case, the first feedback capacitor 525a is approximately "invisible" at internal node dint, and approximately has no affect on the rate at which the voltage of internal node dint falls during the integration phase (when the clock signal is high). If the first feedback signal fb1+ has a voltage at approximately ground, then the voltage across the first feedback capacitor 525a changes. More particularly, the voltage across the first feedback capacitor 525a charges to approximately Vdd when the clock signal is low, and discharges to approximately zero volts when the clock signal is high. In this case, the first feedback capacitor 525a is "visible" at internal node dint, and slows down the rate at which the voltage at internal node dint falls during the integration phase (when the clock signal is high). This is because, in this case, the current I1 needs to discharge both the first feedback capacitor 525a and internal capacitor Cint to lower the voltage of the internal node dint.

Thus, the voltage of the first feedback signal fb1+ (and hence the logic value of the first previous bit decision) affects the rate at which the voltage at internal node dint falls during the integration phase. This mechanism provides feedback of the first previous bit decision at internal node dint.

The capacitance of the first feedback capacitor 525a determines how much influence the first feedback signal fb1+ has on the rate at which the voltage at internal node dint decreases during the integation phase. The larger the capacitance, the greater tha influence. Thus, the capacitance of the first feedback capacitor 525a acts as a filter coefficient (e.g., filter coefficient H1) for weighing the previous bit decision. In this regard, the first feedback capacitor 525a may have a tunable (programmable) capacitance set by a controller 550. In this example, the controller 550 may tune (program) the capacitance of the first feedback capacitor 525a to set the coefficient for the previous bit decision (e.g., according to the characteristics of the channel). An exemplary implementation of a programmable feedback capacitor is discussed further below with reference to FIG. 8. For ease of illustration, the individual connections between the controller 550 and the capacitors 525a and 525b are not shown in FIG. 5.

In one embodiment, the second feedback 510b comprises a second feedback capacitor 525b, a second switching PMOS transistor 520b, and a second switching NMOS transistor 530b. A first terminal 522b of the second feedback capacitor 525b is coupled to internal node dintb of the latch 410, and a second terminal 527b of the second feedback capacitor 525b is coupled to the switching transistors 520b and 530b. The second switching PMOS transistor 520b is between the second terminal 527b of the second feedback capacitor 525b and the second feedback signal fb1−, and the second switching NMOS transistor 530b is between the second terminal 527b of the second feedback capacitor 525b and ground, as shown in FIG. 5.

The gates of both switching transistors 520b and 530b are driven by the clock signal clk. The second switching PMOS transistor 520b is configured to couple the second terminal 527b of the second feedback capacitor 525b to the second feedback signal fb1− when the clock signal clk is low (i.e., during a reset phase of the latch 410). The second NMOS transistor 530b is configured to couple the second terminal 527b of the second feedback capacitor 525b to ground when the clock signal clk is high (i.e., during an integration phase of the latch 410). In one example, the second feedback signal fb1− may have a voltage of Vdd when the first previous bit is zero and a voltage approximately equal to zero volts (ground) when the first previous bit is one, or vice versa.

The first terminal 522b of the second feedback capacitor 525b is charged to Vdd when the clock signal is low through switching PMOS transistor M9, and discharged to approximately ground when the clock signal is high through NMOS transistor M2. Thus, if the second feedback signal fb1− has a voltage of approximately Vdd, then the voltage across the second feedback capacitor 525b approximately does not change. In this case, the second feedback capacitor 525b is approximately "invisible" at internal node dintb, and approximately has no affect on the rate at which the voltage of internal node dintb falls during the integration phase (when the clock signal is high). If the second feedback signal fb1− has a voltage at approximately ground, then the voltage across the second feedback capacitor 525b changes. More particularly, the voltage across the second feedback capacitor 525b charges to approximately Vdd when the clock signal is low, and discharges to approximately zero volts when the clock signal is high. In this case, the second feedback capacitor 525b is "visible" at internal node dintb, and slows down the rate at which the voltage at internal node dintb falls during the integration phase (when the clock signal is high). This is because, in this case, the current I2 needs to discharge both the second feedback capacitor 525b and internal capacitor Cintb to lower the voltage of the internal node dintb.

Thus, the voltage of the second feedback signal fb1− (and hence the logic value of the first previous bit decision) affects the rate at which the voltage at internal node dintb falls during the following integration phase. This mechanism provides feedback of the first previous bit decision at internal node dintb.

The capacitance of the second feedback capacitor 525b determines how much influence the second feedback signal fb1− has on the rate at which the voltage at internal node dintb decreases during the intergation phase. Thus, the capacitance of the second feedback capacitor 525b acts as a filter coefficient (e.g., filter coefficient H1) for weighing the previous bit decision. In this regard, the second feedback capacitor 525b may have a tunable (programmable) capacitance set by the controller 550. In this example, the controller 550 may tune (program) the capacitance of the second feedback capacitor 525b to set the coefficient for the previous bit decision.

In one example, the first feedback signal fb1+ may be provided by output q of the SR latch 440, and the second feedback signal fb1− may be provided by output qb of the SR latch 440. Alternatively, the first feedback signal fb1+ may be provided by output qb of the SR latch 440, and the second feedback signal fb1− may be provided by output q of the SR latch 440. In this case, the first feedback signal fb1+ may be low (grounded) when the first previous bit decision is one and high (e.g., Vdd) then the first previous bit decision is zero, or vice versa.

Figure 6:
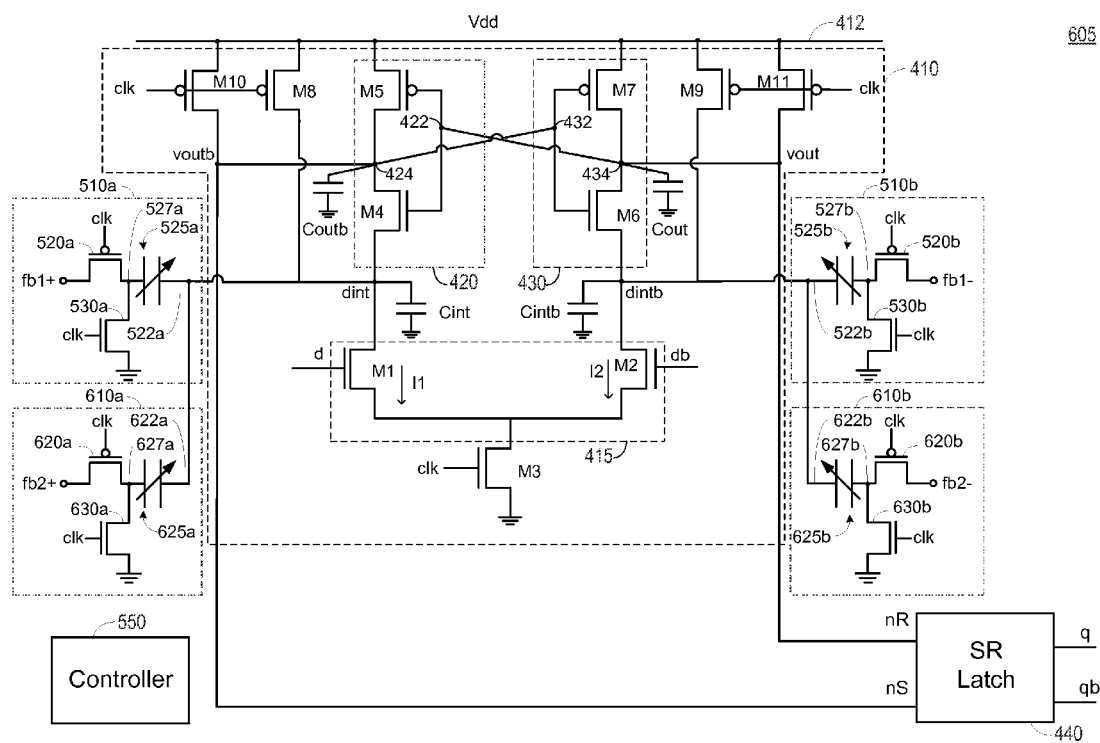
FIG. 6 shows an example of a latch and a two-tap decision feedback equalizer according to certain aspects of the present disclosure.

Although embodiments of the present disclosure are described using the example of a one-tap DFE, it is to be appreciated that embodiments of the present disclosure may be extended to two or more taps by adding additional feedback circuits. In this regard, FIG. 6 shows an example of a quantizer 605 with a two-tap DFE further comprising a third feedback circuit 610a and a fourth feedback circuit 610b. The third and fourth feedback circuits 610a and 610b are configured to provide the latch 410 with feedback of the second previous bit decision, as discussed further below. The third and fourth feedback circuit 610a and 610b may be implemented, for example, by duplicating the first and second feedback circuits 510a and 510b. In certain aspects, feedback of the second previous bit decision is provided by third and fourth complementary feedback signals fb2+ and fb2−. For example, the third feedback signal fb2+ may be high when the second previous bit decision is one and low when the second previous bit decision is zero, or vice versa.

The "2" in fb2+ and fb2− indicates that the third and fourth feedback signals provide feedback of the second previous bit decision.

In one embodiment, the third feedback circuit 610a comprises a third feedback capacitor 625a, a third switching PMOS transistor 620a, and a third switching NMOS transistor 630a. A first terminal 622a of the third feedback capacitor 625a is coupled to internal node dint of the latch 410, and a second terminal 627a of the third feedback capacitor 625a is coupled to the switching transistors 620a and 630a. The third switching PMOS transistor 620a is between the second terminal 627a of the third feedback capacitor 625a and the third feedback signal fb2+, and the third switching NMOS transistor 630a is between the second terminal 627a of the third feedback capacitor 525b and ground, as shown in FIG. 6. The third feedback signal fb2+ is a function of the second previous bit decision, and therefore provides feedback of the second previous bit decision, as discussed further below.

The gates of both switching transistors 620a and 630a are driven by the clock signal clk. The third switching PMOS transistor 620a is configured to couple the second terminal 627a of the third feedback capacitor 625a to the third feedback signal fb2+ when the clock signal clk is low (i.e., during a reset phase of the latch 410). The third NMOS transistor 630a is configured to couple the second terminal 627a of the third feedback capacitor 625a to ground when the clock signal clk is high (i.e., during an integration phase of the latch 410).

In operation, the third feedback circuit 610a provides feedback of the second previous bit decision to internal node dint in a manner similar to the manner in which the first feedback circuit 510a provides feedback of the first previous bit decision to internal node dint. Similar to the first feedback circuit 510a, the filter coefficient associated with the third feedback circuit 610a may be adjusted by tuning the capacitance of the third feedback capacitor 625a.

In one embodiment, the fourth feedback 610b comprises a fourth feedback capacitor 625b, a fourth switching PMOS transistor 620b, and a fourth switching NMOS transistor 630b. A first terminal 622b of the fourth feedback capacitor 625b is coupled to internal node dintb of the latch 410, and a second terminal 627b of the fourth feedback capacitor 625b is coupled to the switching transistors 620b and 630b. The fourth switching PMOS transistor 620b is between the second terminal 627b of the fourth feedback capacitor 625b and the fourth feedback signal fb2−, and the fourth switching NMOS transistor 630b is between the second terminal 627b of the fourth feedback capacitor 625b and ground, as shown in FIG. 6.

The gates of both switching transistors 620b and 630b are driven by the clock signal clk. The fourth switching PMOS transistor 620b is configured to couple the second terminal 627b of the fourth feedback capacitor 625b to the fourth feedback signal fb2− when the clock signal clk is low (i.e., during a reset phase of the latch 410). The fourth NMOS transistor 630b is configured to couple the second terminal 627b of the fourth feedback capacitor 625b to ground when the clock signal clk is high (i.e., during a sample period of the latch).

In operation, the fourth feedback circuit 610b provides feedback of the second previous bit decision to internal node dintb in a manner similar to the manner in which the second feedback circuit 510b provides feedback of the first previous bit decision to internal node dintb. Similar to the second feedback circuit 510b, the filter coefficient associated with the fourth feedback circuit 610b may be adjusted by tuning the capacitance of the fourth feedback capacitor 625b.

Figure 7:
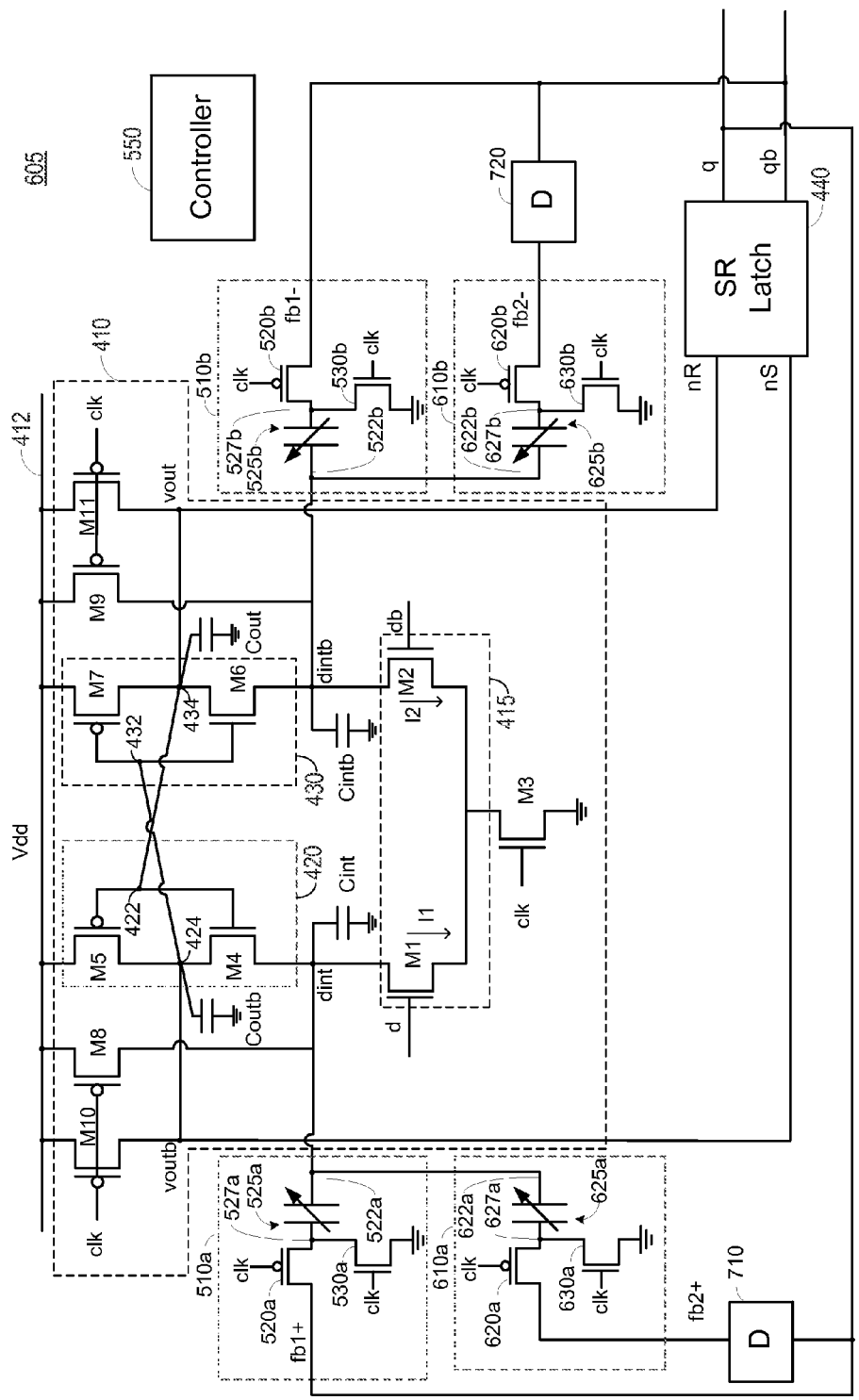
FIG. 7 shows an example of a latch and a two-tap decision feedback equalizer with exemplary decision feedback paths according to certain aspects of the present disclosure.

FIG. 7 shows an example of feedback paths for the feedback circuits 510a, 510b, 610a and 610b for an example of a full-rate system. In this example, the first feedback signal fb1+ may be provided by output q of the SR latch 440, and the second feedback signal fb1− may be provided by output qb of the SR latch 440. Also, the third feedback signal fb2+ may be provided by delaying output q of the SR latch 440 by one clock period using a first delay element 710, and the fourth feedback signal fb2− may be provided by delaying output qb of the SR latch 440 by one clock period using a second delay element 720. Each of the delay elements 710 and 720 may be implemented, for example, using a flip-flop that is clocked by the clock signal clk. In this example, outputs q and qb may be high and low, respectively, when a bit decision is one, and outputs q and qp may be low and high, respectively, when a bit decision is zero. Each of outputs q and qb may have a voltage approximately equal to Vdd when high, and a voltage approximately equal to ground when low.

It is to be appreciated that the feedback paths may be reversed (e.g., depending on the desired polarity of the feedback), in which the first and third feedback signals fb1+ and fb2+ are provided by output qb and the delayed output qb, respectively, and the second and fourth feedback signals fb1− and fb2− are provided by output q and the delayed output q, respectively. It is also to be appreciated that the present disclosure may be extended to three or more taps by duplicating the first and second feedback circuits 510a and 510b for each additional tap, and adding additional delay elements (e.g., flip-flops clocked by the clock signal clk) for each additional tap.

It is also to be appreciated that the feedback signals are not limited to the voltages Vdd and zero volts. In general, the first feedback signal fb+ may have one of two different voltages depending on the logic value of the first previous bit decision. For a voltage other than Vdd and ground, the first feedback signal fb+ may be provided by a digital-to-analog converter (DAC) that receives the first previous bit decision (e.g., output q of the SR latch 440), and converts the bit decision into a corresponding voltage depending on the logic value of the bit decision. An example of this is discussed further below with reference to FIG. 10. The above applies equally to any one of the other feedback signals.

Figure 8:
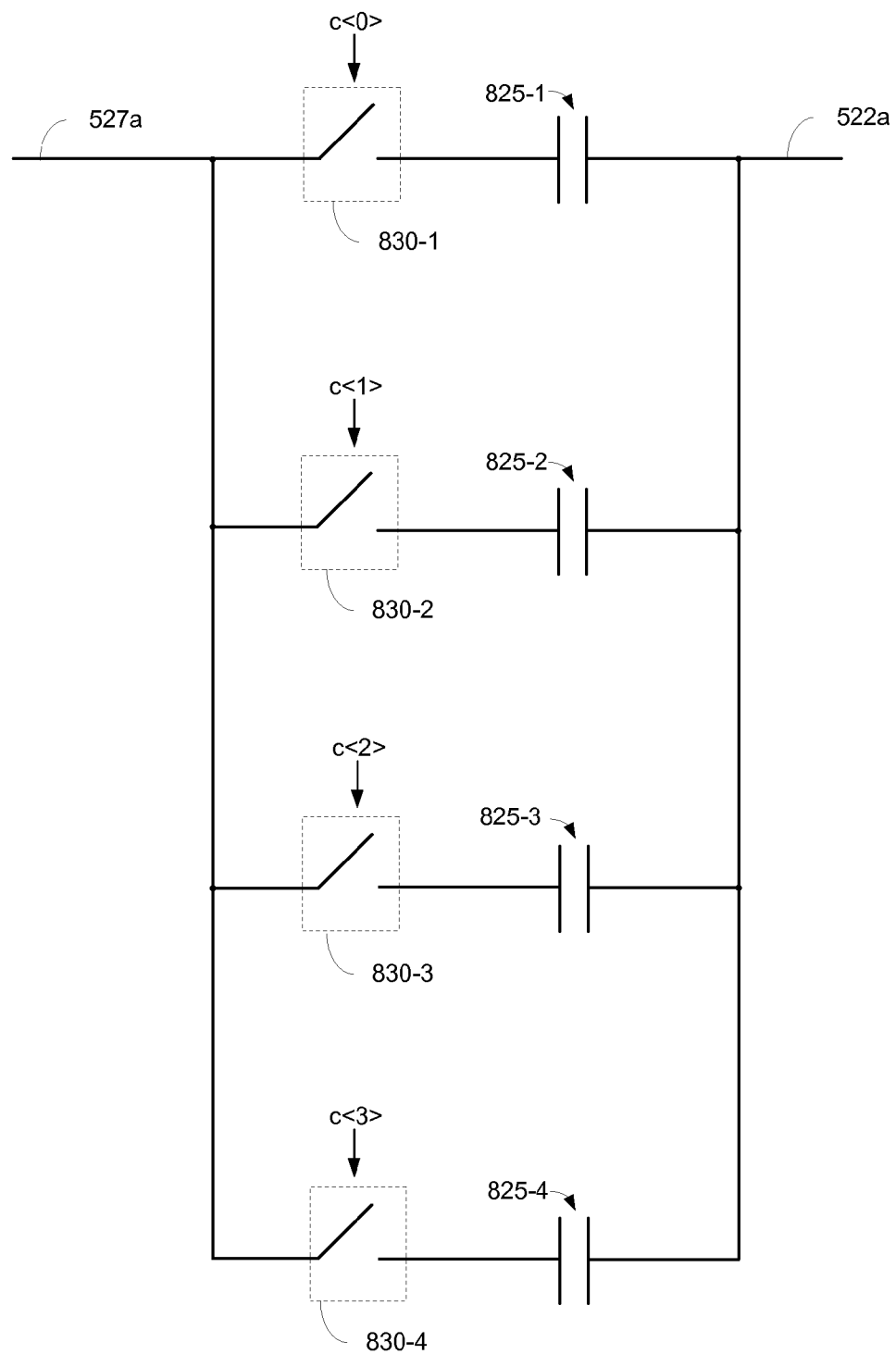
FIG. 8 shows an exemplary implementation of a tunable feedback capacitor according to certain aspects of the present disclosure.

FIG. 8 shows an exemplary implementation of the first feedback capacitor 525a according to certain aspects of the present disclosure. In this example, the first feedback capacitor 525a comprises a plurality of capacitors 825-1 to 825-4 arranged in parallel, and a plurality of control switches 830-1 to 830-4. Each of the control switches 830-1 to 830-4 is arranged in series with a respective one of the capacitors 825-1 to 825-4, as shown in FIG. 8. Each one of the control switches 830-1 to 830-4 is controlled by a respective control bit c<0> to c<3> from the controller 550. Each control bit controls whether the respective control switch is closed or open. For example, each control switch may be implemented using a switching PMOS transistor. In this example, a control switch is closed when the respective control bit is zero and open when the respective control bit is one.

In operation, a capacitor from the plurality of capacitors 825-1 to 825-4 is coupled between the first and second terminals 522a and 527a of the feedback capacitor 525a when the respective one of the control switches 830-1 to 830-4 is closed. Thus, the capacitor contributes to the capacitance of the feedback capacitor 525a when the respective control switch is closed. In this case, the capacitor may be considered enabled. The capacitance of the feedback capacitor 525a is the sum of the capacitances of the capacitors 830-1 to 830-4 that are enabled. Thus, the controller 550 may control the capacitance of the feedback capacitor 525a by controlling which of the capacitors 830-1 to 830-4 are enabled using the control bits c<0> to c<3>. Although four capacitors 830-1 to 830-4 are shown in the example in FIG. 8, it is to be appreciated that the feedback capacitor 525a may be implemented using any number of capacitors. Each of the other feedback capacitors (e.g., feedback capacitors 525b, 625a and 625b) may be implemented using the structure in FIG. 8.

Figure 9:
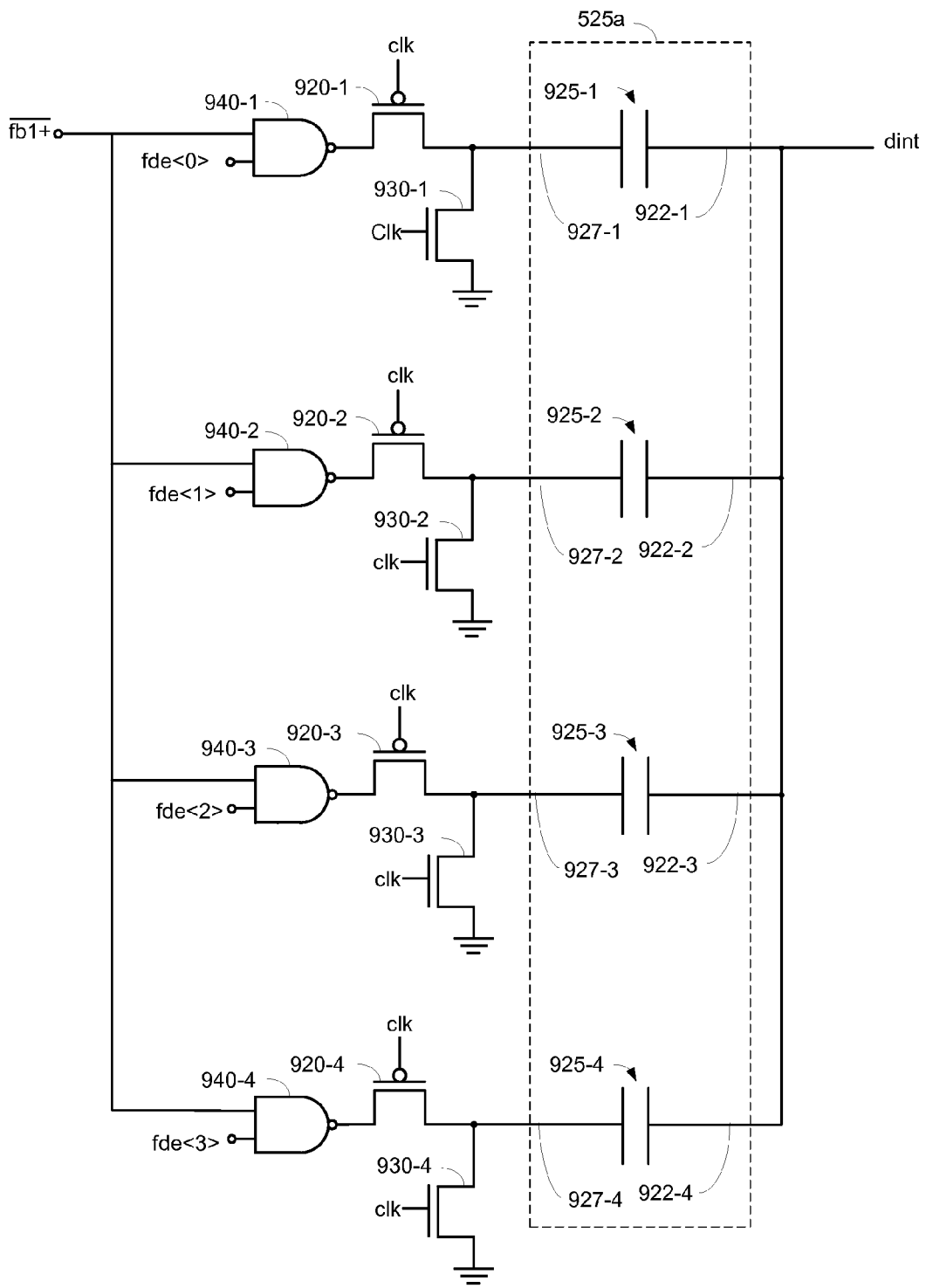
FIG. 9 shows an exemplary implementation of a feedback circuit with tunable capacitance according to certain aspects of the present disclosure.

FIG. 9 shows an exemplary implemention of the first feedback circuit 510a according to certain aspects of the present disclosure. In this example, the first feedback circuit 510a comprises a plurality of capacitors 925-1 to 925-4. The first feedback circuit 510a also comprises a separate NAND gate 940-1 to 940-4, a separate switching PMOS transistor 920-1 to 920-4 and a separate switching NMOS transistor 930-1 to 930-4 for each of the capacitors 925-1 to 925-4. The first terminal 922-1 to 922-4 of each of the capacitors 925-1 to 925-4 is coupled to internal node dint, and the second terminal 927-1 to 927-4 of each of the capacitors 925-1 to 925-4 is coupled to the respective pair of switching PMOS and NMOS transistors, as shown in FIG. 9. Each of the switching PMOS transistors 920-1 to 920-4 is between the output of the respective NAND gate 940-1 to 940-4 and the second terminal 927-1 to 927-4 of the respective capacitor 925-1 to 925-4. Each of the switching NMOS transistors 930-1 to 930-4 is between the second terminal 927-1 to 927-4 of the respective capacitor 925-1 to 925-4 and ground. All of the switching transistors are driven by the clock signal clk. Each of the NAND gates 940-2 to 940-4 has one input that receives the inverse of the first feedback signal (denoted "$\overline{fb1+}$") and a second input that receives a respective enable bit (denoted "fde<0>" to "fde<4>") from the controller 550.

In operation, when an enable bit is one, the respective one of the NAND gates 940-1 to 940-4 passes the inverse of the inverted first feedback signal $\overline{fb1+}$ to the respective one of the switching PMOS transistor 920-1 to 920-4. This is equivalent to passing the first feedback signal fb1+ to the respective one of the switching PMOS transistor 920-1 to 920-4. Thus, when an enable bit is one, the respective one of the capacitors 925-1 to 925-4 contributes to the filter coefficient of the first feedback circuit 510a.

When an enable bit is zero, the respective one of the NAND gates 940-1 to 940-4 blocks the inverted first feedback signal $\overline{fb1+}$ from the respective one of the switching PMOS transistor 920-1 to 920-4. Thus, when an enable bit is zero, the respective one of the capacitors 925-1 to 925-4 does not contribute to the filter coefficient of the first feedback circuit 510a.

The enable bits fde<0> to fde<3> may be set by the controller 550 to control the filter coefficient of the first feedback circuit 510a, for example, according to the characteristics of the channel. Each of the other feedback circuits (e.g., feedback circuits 510b, 610a and 610b) may be implemented using the structure shown in FIG. 9. It is to be appreciated that embodiments of the present disclosure are not limited to the exemplary implementation shown in FIG. 9, and that a feedback circuit with a tunable (programmable) filter coefficient may be implemented using other circuits. For example, the filter coefficient of a feeback circuit may be tuned by adjusting a voltage of the respective feedback signal using a digital-to-anaglog converter (DAC).

Figure 10:
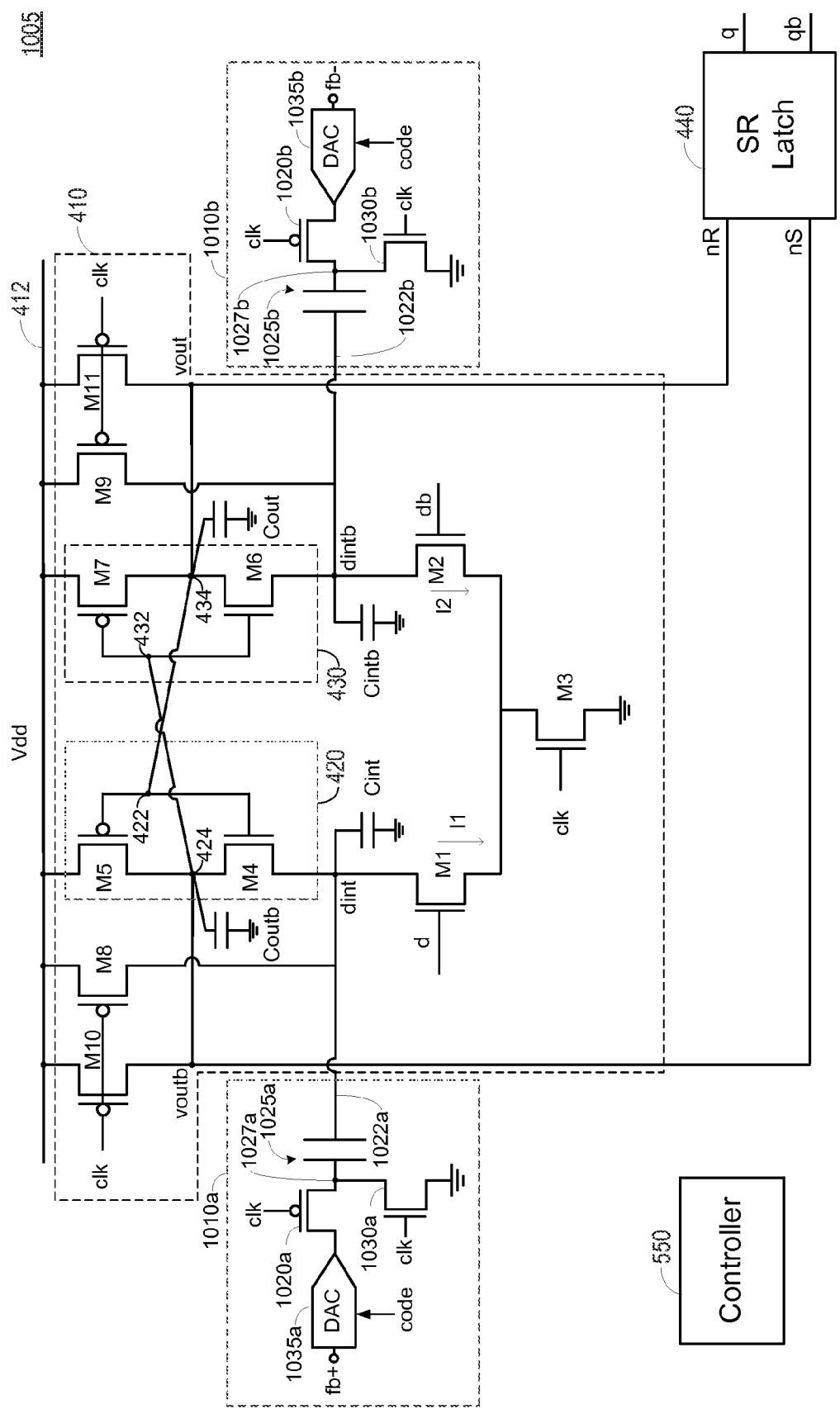
FIG. 10 shows an example of a latch and a decision feedback equalizer with programmable digital-to-analog converters (DACs) according to certain aspects of the present disclosure.

In this regard, FIG. 10 shows an example of a quantizer 1005 according to certain aspects, in which the filter coefficients may be adjusted by adjusting the voltages of the feedback signals. In this example, the first feedback circuit 1010a comprises a first feedback capacitor 1025a, a first switching PMOS transistor 1020a, a first switching NMOS transistor 1030a, and a first DAC 1035a. A first terminal 1022a of the first feedback capacitor 1025a is coupled to internal node dint of the latch 410, and a second terminal 1027a of the first feedback capacitor 1025a is coupled to the switching transistors 1020a and 1030a. The first switching PMOS transistor 1020a is between the second terminal 1027a of the first feedback capacitor 1025a and the output of the first DAC 1035a, and the first switching NMOS transistor 1030a is between the second terminal 1027a of the first feedback capacitor 1025a and ground, as shown in FIG. 10.

The first DAC 1035a receives the first feedback signal fb1+, and converts the first feedback signal fb1+ into a first output voltage (denoted "$V_{DAC1\_1}$") or a second output voltage (denoted "$V_{DAC1\_2}$") depending on the logic value of the first feedback signal fb1+. For example, the first DAC may output the first voltage $V_{DAC1\_1}$ when the first feedback signal fb1+ is one, and output the second voltage $V_{DAC1\_2}$ when the first feedback signal fb1+ is zero, where the first voltage $V_{DAC1\_1}$ may be greater than the second voltage $V_{DAC1\_2}$. In certain aspects, the first voltage $V_{DAC1\_1}$ and the second voltage $V_{DAC1\_2}$ may be programmed by the controller 550 to achieve a desired filter coefficient, as discussed further below. Thus, the first DAC 1035a outputs one of two programmable voltages (i.e., $V_{DAC1\_1}$ and $V_{DAC1\_2}$) depending on the logic value of the feedback signal fb1+ (and hence the first previous bit decision).

The gates of both switching transistors 1020a and 1030a are driven by the clock signal clk. The first switching PMOS transistor 1020a is configured to couple the second terminal 1027a of the first feedback capacitor 1025a to the output of the first DAC 1035a when the clock signal clk is low (i.e., during a reset phase of the latch 410). The first NMOS transistor 1030a is configured to couple the second terminal 1027a of the first feedback capacitor 1025a to ground when the clock signal clk is high (i.e., during an integration phase of the latch).

During a reset phase of the latch 410, the first terminal 1022a of the first feedback capacitor 1025a is coupled to the supply voltage Vdd through switching PMOS transistor M8 (which is closed during the reset phase), and the second terminal 1027a of the first feedback capacitor 1025a is coupled to the output of the first DAC 1035a. Thus, during the reset phase, the voltage across the first feedback capacitor 525a is approximately equal to Vdd minus the output voltage of the first DAC 1035a. The amount of charge stored in the first feedback capacitor 1025a during the reset phase (also referred to as pre-charge phase) depends on the logic value of the feedback signal fb1+ (and hence first previous decision bit). For example, if the feedback signal fb1+ is one, the amount of charge is $C1*(Vdd-V_{DAC1\_1})$ and if the feedback signal fb1+ is zero, the amount of charge is $C1*(Vdd-V_{DAC1\_2})$. Since the first voltage $V_{DAC1\_1}$ is higher than the second voltage $V_{DAC1\_2}$, less charge is stored in the first feedback capacitor 1025a if the first feedback signal fb1+ is one.

During the following integration phase, the voltage of internal node dint falls faster if less charge is stored in the first feedback capacitor 1025a during the reset phase. Thus, the voltage of internal node dint falls faster if the feedback signal fb1+ is one compared with the case where the feedback signal fb1+ is zero. Thus, the rate at which internal node dint falls during the integration phase depends on the logic value of the first feedback signal fb1+, and thus, the logic value of the first previous decision bit. This mechanism provides feedback of the first previous bit decision at internal node dint.

The difference in the amount of charge stored in the first feedback capacitor 525a for the two different logic values of the first feedback signal fb1+ (and hence first previous decision bit) is proportional to the difference between the first and second output voltages $V_{DAC1\_1}$ and $V_{DAC1\_2}$. The larger the difference between the first and second output voltages $V_{DAC1\_1}$ and $V_{DAC1\_2}$, the greater the difference in the amount of charge stored in the first feedback capacitor 1025a for the two different logic values of the first feedback signal fb1+. The greater difference in the stored charge translates into a greater difference in the fall time of the voltage at internal node dint during the integration time. Thus, the larger the difference between the first and second output voltages $V_{DAC1\_1}$ and $V_{DAC1\_2}$, the greater the influence of the logic value of the feedback signal fb1+ (and hence the first previous bit decision) on the fall time of the voltage at internal node dint, and therefore the larger the filter coefficient for the first previous bit decision. Thus, the controller 550 may adjust the filter coefficient by adjusting the first and second output voltages $V_{DAC1\_1}$ and $V_{DAC1\_2}$. The filter coefficient may be greatest when the first voltage $V_{DAC1\_1}$ is approximately equal to Vdd and the second voltage $V_{DAC1\_2}$ is approximately equal to zero volts.

Figure 11:
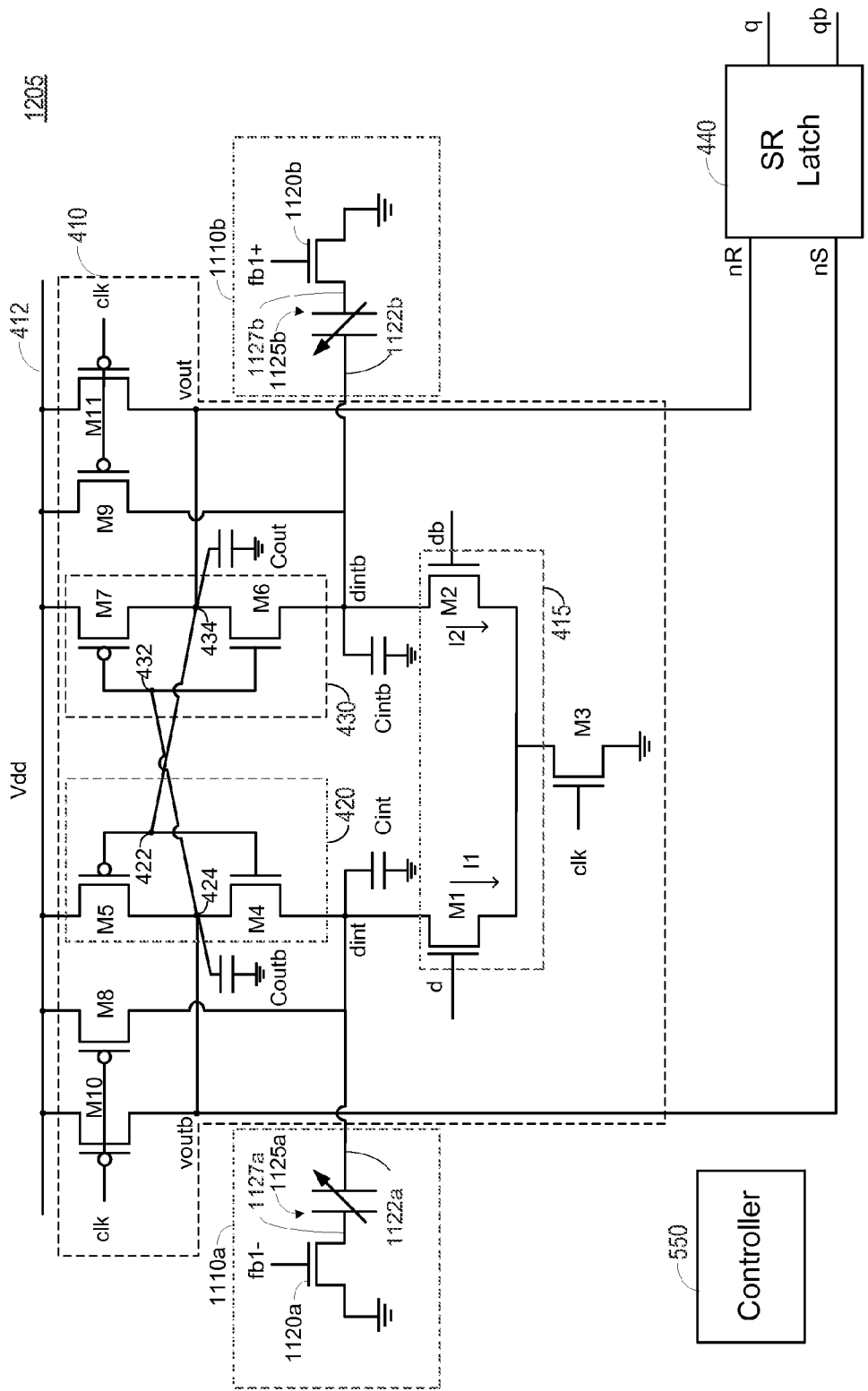
FIG. 11 shows an example of a latch and a decision feedback equalizer with switch capacitors according to certain aspects of the present disclosure.

In this example, the second feedback circuit 1010b comprises a second feedback capacitor 1025b, a second switching PMOS transistor 1020b, a second switching NMOS transistor 1030b, and a second DAC 1035b. A first terminal 1022b of the second feedback capacitor 1025b is coupled to internal node dintb of the latch 410, and a second terminal 1027b of the second feedback capacitor 1025b is coupled to the switching transistors 1020b and 1030b. The second switching PMOS transistor 1020b is between the second terminal 1027b of the second feedback capacitor 1025b and the output of the second DAC 1035b, and the second switching NMOS transistor 1030b is between the second terminal 1027b of the second feedback capacitor 1025b and ground, as shown in FIG. 11.

The second DAC 1035b receives the second feedback signal fb1−, and converts the second feedback signal fb1− into a first output voltage (denoted "$V_{DAC2\_1}$") or a second output voltage (denoted "$V_{DAC2\_2}$") depending on the logic value of the second feedback signal fb1−. For example, the second DAC may output the first voltage $V_{DAC2\_1}$ when the second feedback signal fb1− is one, and output the second voltage $V_{DAC2\_2}$ when the second feedback signal fb1− is zero, where the first voltage $V_{DAC2\_1}$ may be greater than the second voltage $V_{DAC2\_2}$. In certain aspects, the first voltage $V_{DAC2\_1}$ and the second voltage $V_{DAC2\_2}$ may be programmed by the controller 550 to achieve a desired filter coefficient, as discussed further below. Thus, the second DAC 1035b outputs one of two programmable voltages (i.e., $V_{DAC2\_1}$ and $V_{DAC2\_2}$) depending on the logic value of the feedback signal fb1− (and hence the first previous bit decision).

The gates of both switching transistors 1020b and 1030b are driven by the clock signal clk. The second switching PMOS transistor 1020b is configured to couple the second terminal 1027a of the second feedback capacitor 1025b to the output of the second DAC 1035b when the clock signal clk is low (i.e., during a reset phase of the latch 410). The second NMOS transistor 1030b is configured to couple the second terminal 1027b of the second feedback capacitor 1025b to ground when the clock signal clk is high (i.e., during a sample period of the latch).

During a reset phase of the latch 410, the first terminal 1022b of the second feedback capacitor 1025b is coupled to the supply voltage Vdd through switching PMOS transistor M9 (which is closed during the reset phase), and the second terminal 1027b of the second feedback capacitor 1025b is coupled to the output of the second DAC 1035b. Thus, during the reset phase, the voltage across the second feedback capacitor 1025b is approximately equal to Vdd minus the output voltage of the second DAC 1035b. The amount of charge stored in the second feedback capacitor 1025b during the reset phase (also referred to as pre-charge phase) depends on the logic value of the feedback signal fb1− (and hence first previous decision bit). For example, if the feedback signal fb1− is one, the amount of charge is C2 *(Vdd−$V_{DAC2\_1}$) and if the feedback signal fb1− is zero, the amount of charge is C2 *(Vdd−$V_{DAC2\_2}$). Since the first voltage $V_{DAC2\_1}$ is higher than the second voltage $V_{DAC2\_2}$, less charge is stored in the second feedback capacitor 1025b if the second feedback signal fb1− is one.

During the following integration phase, the voltage of internal node dintb falls faster if less charge is stored in the second feedback capacitor 1025b during the reset phase. Thus, the voltage of internal node dintb falls faster if the feedback signal fb1− is one compared with the case where the feedback signal fb1− is zero. Thus, the rate at which internal node dintb falls during the integration phase depends on the logic value of the second feedback signal fb1−, and thus, the logic value of the first previous decision bit. This mechanism provides feedback of the first previous bit decision at internal node dintb.

The difference in the amount of charge stored in the second feedback capacitor 1025b for the two different logic values of the second feedback signal fb1− (and hence first previous decision bit) is proportional to the difference between the first and second output voltages $V_{DAC2\_1}$ and $V_{DAC2\_2}$. The larger the difference between the first and second output voltages $V_{DAC2\_1}$ and $V_{DAC2\_2}$, the greater the difference in the amount of charge stored in the second feedback capacitor 1025b for the two different logic values of the second feedback signal fb1−. The greater difference in the stored charge translates into a greater difference in the fall time of the voltage at internal node dintb during the integration time. Thus, the larger the difference between the first and second output voltages $V_{DAC2\_1}$ and $V_{DAC2\_2}$, the greater the influence of the logic value of the feedback signal fb1− (and hence the first previous bit decision) on the fall time of the voltage at internal node dintb, and therefore the larger the filter coefficient for the first previous bit decision. Thus, the controller 550 may adjust the filter coefficient by adjusting the first and second output voltages $V_{DAC2\_1}$ and $V_{DAC2\_2}$. The filter coefficient may be greatest when the first voltage $V_{DAC2\_1}$ is approximately equal to Vdd and the second voltage $V_{DAC2\_2}$ is approximately equal to zero volts.

In certain aspects, the controller 550 may program the output voltages of the DACs 1035a and 1035b by inputting a control code (denoted "code") to each of the DACs, where the control code may comprise a plurality of control bits. The control bits for each DAC may specify the two output voltages for the DAC. Also, the output of each DAC may be considered a feedback signal since the output voltage of the DAC depends on the logic state of the respective previous bit and therefore provides feedback of the respective previous bit.

It is to be appreciated that the feedback signals fb1+ and fb1− may be provided by outputs q and qp, respectively, of the SR latch 440, or vice versa. It is also to be appreciated that the feedback equalizer in FIG. 10 may be extended to two or more taps by duplicating the first and second feedback circuits for each additional tap, and adding additional delay elements (e.g., flip-flops clocked by the clock signal clk) for each additional tap.

FIG. 11 shows a quantizer 1105 according to certain aspects of the present disclosure. The quantizer 1105 comprises a decision feedback equalizer including a first feedback circuit 1110a and a second feedback 1110b. The first and second feedback circuits 1110a and 1110b are configured to feedback the first previous bit decision to the latch 410, as discussed further below. In certain aspects, feedback of the first previous bit decision is provided by first and second complementary feedback signals fb1+ and fb1−. For example, the first feedback signal fb1+ may be high when the first previous bit decision is one and low when the first previous bit decision is zero, or vise versa.

In one embodiment, the first feedback circuit 1110a comprises a first feedback capacitor 1125a, and a first switching NMOS transistor 1120a. A first terminal 1122a of the first feedback capacitor 1125a is coupled to internal node dint of the latch 410, and a second terminal 1127a of the first feedback capacitor 1125a is coupled to the first switching NMOS transistor 1120a. The first switching NMOS transistor 1120a is between the second terminal 1127a of the first feedback capacitor 1125a and ground, as shown in FIG. 11.

The gate of the first switching NMOS transistor 1120a is driven by the second feedback signal fb1−. The first switching NMOS transistor 1120a is configured to couple the second terminal 1127a of the first feedback capacitor 1125a to ground when the second feedback signal fb1− is one, and to decouple the second terminal 1127a of the first feedback capacitor 1125a from ground (i.e., allow the second terminal 1127a to float) when the second feedback signal fb1− is zero.

During a reset phase of the latch 410, the first terminal 1122a of the first feedback capacitor 1125a is coupled to the supply voltage Vdd through switching PMOS transistor M8 (which is closed during the reset phase). The second terminal 1127a is either coupled to ground or floating depending on the logic value of the second feedback signal fb1−, and thus the logic value of the first previous bit decision. In one example, the second feedback signal fb1− may have a voltage of Vdd when the first previous bit decision is zero and a voltage approximately equal to zero volts (ground) when the first previous decision bit is one.

In this example, when the previous bit decision is zero, the second terminal 1127a is coupled to ground by the first switching NMOS transistor 1120a. As a result, the first feedback capacitor 1125a is charged to Vdd during the reset phase and stores a charge of approximately C1*Vdd, where C2 is the capacitance of the first feedback capacitor 1125a. At the start of the following integration phase, the charge stored in the first feedback capacitor 1125a adds additional charge at internal node dint, which may increase the amount of charge that needs to be discharged to lower the voltage at internal node dint. This causes the voltage at internal node dint to fall slower during the intergation phase.

When the previous bit decision is one, the second terminal 1127a of the first feedback capacitor 1125a is floating. As a result, the first feedback capacitor 1125a is not seen at internal node dint. At the start of the following integration phase, the first feedback capacitor 1125a does not add charge to internal node dint, and hence does not slow down the fall time of the voltage at internal node dint.

Thus, the logic value of the second feedback signal fb1− (and hence the logic value of the first previous bit decision) determines whether the first feedback capacitor 1125a is seen at internal node dint, which affects the rate at which the voltage at internal node dint falls during the integration phase. This mechanism provides feedback of the first previous bit decision at internal node dint.

The capacitance of the first feedback capacitor 1125a determines how much influence the second feedback signal fb1− has on the rate at which the voltage at internal node dint decreases during the integation phase. The larger the capacitance, the greater tha influence. Thus, the capactitance of the first feedback capacitor 1125a acts as a filter coefficient (e.g., filter coefficient H1) for weighing the previous bit decision. In this regard, the first feedback capacitor 1125a may have a tunable (programmable) capacitance set by the controller 550.

In one embodiment, the second feedback circuit 1110b comprises a second feedback capacitor 1125b, and a second switching NMOS transistor 1120b. A first terminal 1122b of the second feedback capacitor 1125b is coupled to internal node dintb of the latch 410, and a second terminal 1127b of the second feedback capacitor 1125b is coupled to the second switching NMOS transistor 1120b. The second switching NMOS transistor 1120b is between the second terminal 1127b of the second feedback capacitor 1125b and ground, as shown in FIG. 11.

The gate of the second switching NMOS transistor 1120b is driven by the first feedback signal fb1+. The second switching NMOS transistor 1120b is configured to couple the second terminal 1127b of the second feedback capacitor 1125b to ground when the first feedback signal fb1+ is one, and to decouple the second terminal 1127b of the second feedback capacitor 1125b from ground (i.e., allow the second terminal 1127b to float) when the first feedback signal fb1+ is zero.

During a reset phase of the latch 410, the first terminal 1122b of the second feedback capacitor 1125b is coupled to the supply voltage Vdd through switching PMOS transistor M9 (which is closed during the reset phase). The second terminal 1127b is either coupled to ground or floating depending on the logic value of the first feedback signal fb1+, and thus the logic value of the first previous bit decision. In one example, the first feedback signal fb1+ may have a voltage of Vdd when the first previous bit decision is one and a voltage approximately equal to zero volts (ground) when the first previous bit decision is zero.

In this example, when the previous bit decision is one, the second terminal 1127b is coupled to ground by the second switching NMOS transistor 1120b. As a result, the second feedback capacitor 1125b is charged to Vdd during the reset phase and stores a charge of approximately C2 *Vdd, where C2 is the capacitance of the second feedback capacitor 1125b. At the start of the following integration phase, the charge stored in the second feedback capacitor 1125b adds additional charge at internal node dint, which may increase the amount of charge that needs to be discharged to lower the voltage at internal node dintb. This causes the voltage at internal node dintb to fall slower during the intergation phase.

When the previous bit decision is zero, the second terminal 1127b of the second feedback capacitor 1125b is floating. As a result, the second feedback capacitor 1125b is not seen at internal node dintb. At the start of the following integration phase, the second feedback capacitor 1125b does not add charge to internal node dintb, and hence does not slow down the fall time of the voltage at internal node dintb.

Thus, the logic value of the first feedback signal fb1+ (and hence the logic value of the first previous bit decision) determines whether the second feedback capacitor 1125b is seen at internal node dintb, which affects the rate at which the voltage at internal node dintb falls during the integration phase. This mechanism provides feedback of the first previous bit decision at internal node dintb.

The capacitance of the second feedback capacitor 1125b determines how much influence the first feedback signal fb1+ has on the rate at which the voltage at internal node dintb decreases during the integation phase. The larger the capacitance, the greater tha influence. Thus, the capactitance of the second feedback capacitor 1125b acts as a filter coefficient (e.g., filter coefficient H1) for weighing the previous bit decision. In this regard, the second feedback capacitor 1125b may have a tunable (programmable) capacitance set by the controller 550.

It is to be appreciated that the feedback signals fb1+ and fb1− may be provided by outputs q and qp, respectively, of the SR latch 440, or vice versa. It is also to be appreciated that the feedback equalizer in FIG. 11 may be extended to two or more taps by duplicating the first and second feedback circuits for each additional tap, and adding additional delay elements (e.g., flip-flops clocked by the clock signal clk) for each additional tap.

Figure 12:
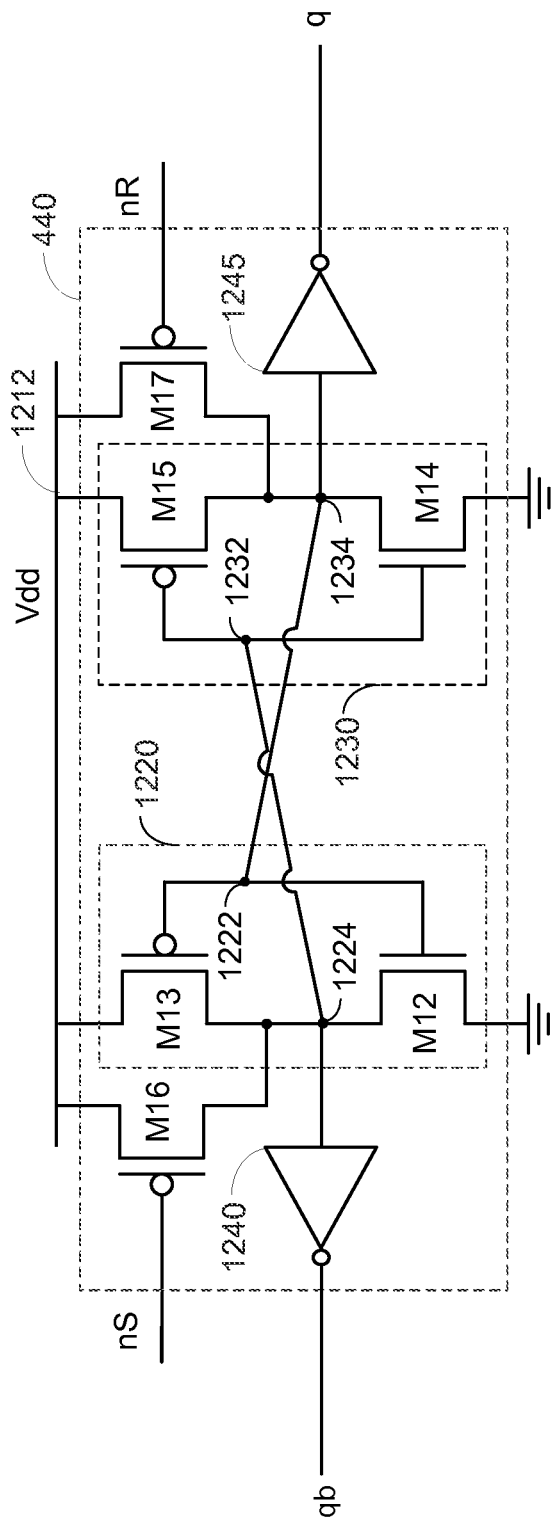
FIG. 12 shows an exemplary implementation of a set-reset (SR) latch according to certain aspects of the present disclosure.

FIG. 12 shows an exemplary implementation of the SR latch 440 according to certain aspects. In this example, the SR latch 440 comprises cross-coupled inverters 1220 and 1230, where a first one of the inverters 1220 comprises PMOS transistor M13 and NMOS transistor M12 and a second one of the inverters 1230 comprises PMOS transistor M15 and NMOS transistor M14. The output 1224 of the first inverter 1220 is coupled to the input 1232 of the second inverter 1230 (i.e., the gates of PMOS transistor M15 and NMOS transistor M14), and the output 1234 of the second inverter 1230 is coupled to the input 1322 of the first inverter 1220 (i.e., the gates of PMOS transistor M13 and NMOS transistor M12). The SR latch 440 also comprises a first input PMOS transistor M16 coupled between the supply rail 1212 and the output 1224 of the first inverter 1220, and a second input transistor M17 coupled between the supply rail 1212 and the output 1234 of the second inverter 1230. The SR latch 440 further comprises a third inverter 1240 coupled between the output 1224 of the first inverter 1220 and the output qb of the SR latch 440, and a fourth inverter 1245 coupled between the output 1234 of the second inverter 1230 and the output q of the SR latch 440.

In operation, when the inputs nS and nR of the SR latch 440 are different, the cross-coupled inverters 1220 and 1234 output logic values according to the voltages at the inputs nS and nR. For example, when input nR (which may be coupled to output 434 of the strong-arm latch) is lower than input nS, the second PMOS transistor M17 is turned on. This pulls up output 1234 to Vdd, causing the cross-coupled inverters 1220 and 1230 to output a one at output 1234 and a zero at output 1224. In this case, the outputs q and qp of the SR latch 440 are zero and one, respectively. When both inputs nS and nR go high during the reset phase, the first and second input PMOS transistors M16 and M17 both turn off. As a result, the SR latch 440 latches the logic values at the input nS and nR just before the inputs nS and nR go high (approximately the end of the integration phase). Thus, the SR latch 440 samples the logic values at the inputs nS and nR at approximately the end of the integration phase, and outputs the sampled values during the following reset phase. It is to be appreciated that the SR latch 440 is not limited to the exemplary implementation shown in FIG. 12.

Figure 13:
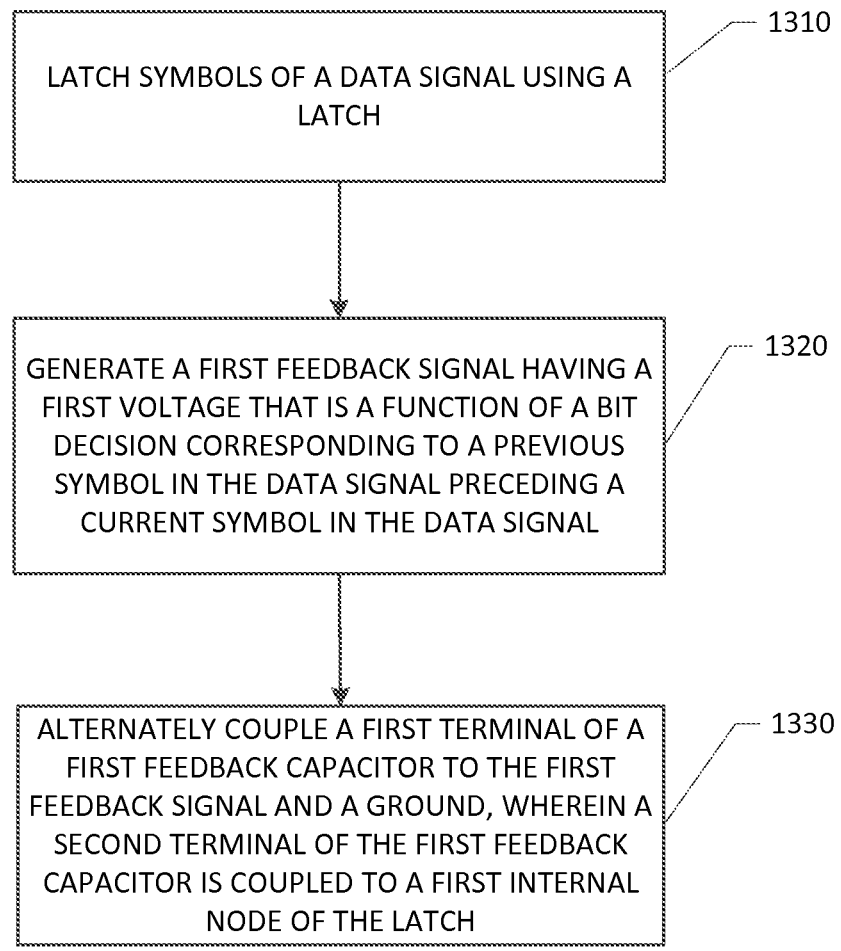
FIG. 13 is a flowchart showing a method for decision feedback equalization according to certain aspects of the present disclosure.

FIG. 13 is a flowchart illustrating a method 1300 of decision feedback equalization according to certain embodiments of the present disclosure.

At step 1310, symbols of a data signal are latched using a latch. For example, the symbols may be latched using a strong-arm latch (e.g., strong-arm latch 410) according to a sampling clock (e.g., sampling clock clk).

At step 1320, a first feedback signal is generated having a first voltage that is a function of a bit decision corresponding to a first previous symbol in the data signal preceding a current symbol in the data signal. For example, the first feedback signal may be provided by one of the outputs q and qp of the SR latch 440.

At step, 1330, a first terminal of a first feedback capacitor is alternately coupled to the first feedback signal and a ground, wherein a second terminal of the feedback capacitor is coupled to a first internal node of the latch. For example, the first terminal (e.g., terminal 527*a*) of the first feedback capacitor (e.g., first feedback capacitor 525*a*) may be coupled to the first feedback signal (e.g., feedback signal fb1+) during a reset phase of the latch (e.g., strong-arm latch 410) and coupled to ground during an integration phase of the latch. The second terminal (e.g., terminal 522*a*) of the first feedback capacitor may be coupled to an internal node (e.g., internal node dint) coupling one of cross-coupled inverters (e.g., cross-coupled inverters 420 and 430) to an input driver (input driver 415) of the latch.

The controller according to any of the implementations discussed above may be implemented with a general-purpose processor, a digital signal processor (DSP), an application specific integrated circuit (ASIC), a field programmable gate array (FPGA) or other programmable logic device, discrete hardware components, or any combination thereof designed to perform the functions described herein. A general-purpose processor may be a microprocessor, but in the alternative, the processor may be any conventional processor, controller, microcontroller, or state machine. A processor may perform the functions described herein by executing software comprising code for performing the functions. The software may be stored on a computer-readable storage medium, such as a RAM, a ROM, an EEPROM, an optical disk, and/or a magnetic disk.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A receiver, comprising:
   a latch configured to receive a data signal and to latch a current symbol in the received data signal; and
   a decision feedback equalizer comprising:
      a first feedback capacitor having first and second terminals, the first terminal being coupled to a first internal node of the latch; and
      a first plurality of switches configured to alternatively couple the second terminal of the first feedback capacitor to a first feedback signal and a ground, the first feedback signal having a first voltage that is a function of a bit decision corresponding to a first previous symbol in the data signal preceding the current symbol in the data signal, wherein the first plurality of switches comprises:
         a first switch between the second terminal of the first feedback capacitor and the first feedback signal; and
         a second switch between the second terminal of the first feedback capacitor and the ground, wherein the first switch is configured to couple the second terminal of the first feedback capacitor to the first feedback signal during a reset phase of the latch, and the second switch is configured to couple the second terminal of the first feedback capacitor to the ground during an integration phase of the latch.

2. The receiver of claim 1, wherein the latch comprises:
   cross-coupled inverters, wherein an input of a first one of the inverters is coupled to an output of a second one of the inverters and an output of the first one of the inverters is coupled to an input of the second one of the inverters; and
   an input driver configured to receive the data signal, and to trigger the cross-coupled inverters to enter one of two output states based on the received data signal;
   wherein the first internal node of the latch is a node coupling one of the cross-coupled inverters to the input driver.

3. The receiver of claim 2, wherein the latch further comprises a reset switch configured to couple the first internal node to a supply voltage during the reset phase of the latch to pre-charge the first internal node, and to decouple the first internal node from the supply voltage during the integration phase of the latch.

4. The receiver of claim 1, wherein the first feedback capacitor has a programmable capacitance.

5. The receiver of claim 1, wherein the first and second switches are driven by a clock signal, the first switch is configured to couple the second terminal of the first feedback capacitor to the first feedback signal when the clock signal is in a first logic state and the second switch is configured to couple the second terminal of the first feedback capacitor to the ground when the clock signal is in a second logic state.

6. The receiver of claim 1, further comprising:
   a second feedback capacitor having first and second terminals, the first terminal of the second feedback capacitor being coupled to the first internal node of the latch; and
   a second plurality of switches configured to alternatively couple the second terminal of the second feedback capacitor to a second feedback signal and the ground, the second feedback signal having a voltage that is a function of a bit decision corresponding to a second previous symbol in the data signal preceding the current symbol and the first previous symbol.

7. The receiver of claim 1, further comprising:
   a second feedback capacitor having first and second terminals, the first terminal of the second feedback capacitor being coupled to a second internal node of the latch; and
   a second plurality of switches configured to alternatively couple the second terminal of the second feedback capacitor to a second feedback signal and the ground, the second feedback signal having a second voltage that is a function of the bit decision corresponding to the first previous symbol.

8. The receiver of claim 7, wherein the first feedback signal and the second feedback signal are complementary.

9. The receiver of claim 7, wherein the latch comprises:
cross-coupled inverters, wherein an input of a first one of the inverters is coupled to an output of a second one of the inverters and an output of the first one of the inverters is coupled to an input of the second one of the inverters; and
an input driver configured to receive the data signal, and to trigger the cross-coupled inverters to enter one of the two output states based on the received data signal;
wherein the first internal node of the latch couples the first one of the cross-coupled inverters to the input driver and the second internal node of the latch couples the second one of the cross-coupled inverters to the input driver.

10. The receiver of claim 9, wherein the input driver comprises a first input transistor and a second input transistor, the first internal node is between the first input transistor and the first one of the inverters, and the second internal node is between the second input transistor and the second one of the inverters.

11. The receiver of claim 1, further comprising a digital-to-analog converter (DAC) configured to output one of two output voltages depending on a logic value of the bit decision corresponding to the first previous symbol, wherein the output of the DAC provides the first feedback signal.

12. The receiver of claim 11, wherein the output voltages of the DAC are programmable.

13. A method of decision feedback equalization, comprising:
latching a current symbol in a data signal using a latch;
generating a first feedback signal having a first voltage that is a function of a bit decision corresponding to a first previous symbol in the data signal preceding the current symbol in the data signal; and
alternately coupling a first terminal of a first feedback capacitor to the first feedback signal and a ground, wherein a second terminal of the first feedback capacitor is coupled to a first internal node of the latch;
wherein alternately coupling the first terminal of the first feedback capacitor to the first feedback signal and the ground comprises:
coupling the first terminal of the first feedback capacitor to the first feedback signal during a reset phase of the latch by turning on a first switch between the first terminal of the first feedback capacitor and the first feedback signal; and
coupling the first terminal of the first feedback capacitor to the ground during an integration phase of the latch by turning on a second switch between the first terminal of the first feedback capacitor and the ground.

14. The method of claim 13, wherein the latch comprises cross-coupled inverters and an input driver, and the first internal node couples one of the cross-coupled inverters to the input driver.

15. The method of claim 14, further comprising:
coupling the first internal node to a supply voltage during the reset phase of the latch to pre-charge the first internal node; and
decoupling the first internal node from the supply voltage during the integration phase of the latch.

16. The method of claim 13, further comprising adjusting a capacitance of the first feedback capacitor to achieve a desired filter coefficient.

17. The method of claim 13, further comprising:
generating a second feedback signal having a voltage that is a function of a bit decision corresponding to a second previous symbol in the data signal preceding the current symbol and the first previous symbol; and
alternately coupling a first terminal of a second feedback capacitor to the second feedback signal and the ground, wherein a second terminal of the second feedback capacitor is coupled to the first internal node of the latch.

18. The method of claim 13, further comprising:
generating a second feedback signal having a second voltage that is a function of the bit decision corresponding to the first previous symbol; and
alternately coupling a first terminal of a second feedback capacitor to the second feedback signal and the ground, wherein a second terminal of the second feedback capacitor is coupled to a second internal node of the latch.

19. The method of claim 18, wherein the first feedback signal and the second feedback signal are complementary.

20. An apparatus for decision feedback equalization, comprising:
means for latching a current symbol in a data signal;
means for generating a first feedback signal having a first voltage that is a function of a bit decision corresponding to a first previous symbol in the data signal preceding the current symbol in the data signal; and
means for alternately coupling a second terminal of a first feedback capacitor to the first feedback signal and a ground, wherein a first terminal of the first feedback capacitor is coupled to a first internal node of the latch;
wherein the means for alternately coupling the second terminal of the first feedback capacitor to the first feedback signal and the ground comprises:
a first switch between the second terminal of the first feedback capacitor and the first feedback signal; and
a second switch between the second terminal of the first feedback capacitor and the ground, wherein the first switch is configured to couple the second terminal of the first feedback capacitor to the first feedback signal during a reset phase of the latch, and the second switch is configured to couple the second terminal of the first feedback capacitor to the ground during an integration phase of the latch.

21. The apparatus of claim 20, further comprising:
means for coupling the first internal node to a supply voltage during the reset phase of the means for latching to pre-charge the first internal node; and
means for decoupling the first internal node from the supply voltage during the integration phase of the means for latching.

22. The apparatus of claim 20, further comprising means for adjusting a capacitance of the first feedback capacitor to achieve a desired filter coefficient.

23. The apparatus claim 20, further comprising:
means for generating a second feedback signal having a voltage that is a function of a bit decision corresponding to a second previous symbol in the data signal preceding the current symbol and the first previous symbol; and
means for alternately coupling a second terminal of a second feedback capacitor to the second feedback signal and the ground, wherein a first terminal of the second feedback capacitor is coupled to the first internal node of the latch.

24. The apparatus of claim 20, further comprising:
means for generating a second feedback signal having a second voltage that is a function of the bit decision corresponding to the first previous symbol; and means for alternately coupling a second terminal of a second feedback capacitor to the second feedback signal and the ground, wherein a first terminal of the second feedback capacitor is coupled to a second internal node of the latch.

25. The apparatus of claim 24, wherein the first feedback signal and the second feedback signal are complementary.

26. A receiver, comprising:
a latch configured to receive a data signal and to latch a current symbol in the received data signal; and a decision feedback equalizer comprising:
a first feedback capacitor having first and second terminals, the first terminal being coupled to a first internal node of the latch;
a first switching transistor between the second terminal of the first feedback capacitor and a ground, wherein a gate of the first switching transistor is driven by a first feedback signal,
the first feedback signal having a first voltage that is a function of a bit decision corresponding to a first previous symbol in the data signal preceding the current symbol in the data signal;
a second feedback capacitor having first and second terminals, the first terminal of the second feedback capacitor being coupled to a second internal node of the latch; and
a second switching transistor between the second terminal of the second feedback capacitor and the ground, wherein a gate of the second switching transistor is driven by a second feedback signal, the second feedback signal having a second voltage that is a function of the bit decision corresponding to the first previous symbol in the data signal preceding the current symbol in the data signal.

27. A receiver, comprising:
a latch configured to receive a data signal and to latch a current symbol in the received data signal, the latch comprising:
cross-coupled inverters, wherein an input of a first one of the inverters is coupled to an output of a second one of the inverters and an output of the first one of the inverters is coupled to an input of the second one of the inverters;
an input driver configured to receive the data signal, and to trigger the cross-coupled inverters to enter one of two output states based on the received data signal; and
a switching NMOS transistor between the input driver and a ground, wherein the switching NMOS transistor is configured to decouple the input driver from the ground during a reset phase of the latch, and to couple the input driver to the ground during an integration phase of the latch; and a decision feedback equalizer comprising:
a feedback capacitor having first and second terminals, the first terminal being coupled to an internal node coupling one of the cross-coupled inverters to the input driver; and
a plurality of switches configured to alternatively couple the second terminal of the feedback capacitor to a feedback signal and the ground, the feedback signal having a voltage that is a function of a bit decision corresponding to a previous symbol in the data signal preceding the current symbol in the data signal.

28. The receiver of claim 27, wherein the latch further comprises a reset switch configured to couple the internal node to a supply voltage during the reset phase of the latch to pre-charge the first internal node, and to decouple the first internal node from the supply voltage during the integration phase of the latch.

29. The receiver of claim 28, wherein the plurality of switches comprises a first switch configured to couple the second terminal of the first feedback capacitor to the first feedback signal during the reset phase of the latch, and a second switch configured to couple the second terminal of the first feedback capacitor to the ground during the integration phase of the latch.

30. The receiver of claim 9, wherein the latch further comprises a switching NMOS transistor between the input driver and the ground, wherein the switching NMOS transistor is configured to decouple the input driver from the ground during a reset phase of the latch, and to couple the input driver to the ground during an integration phase of the latch.

31. The receiver of claim 26, further comprising:
cross-coupled inverters, wherein an input of a first one of the inverters is coupled to an output of a second one of the inverters and an output of the first one of the inverters is coupled to an input of the second one of the inverters; and
an input driver configured to receive the data signal, and to trigger the cross-coupled inverters to enter one of two output states based on the received data signal;
wherein the first internal node of the latch is a node coupling one of the cross-coupled inverters to the input driver.

32. The receiver of claim 1, wherein the latch further comprises a reset switch configured to couple the first internal node to a supply voltage during the reset phase of the latch to pre-charge the first internal node, and to decouple the first internal node from the supply voltage during the integration phase of the latch.

* * * * *